US007124364B2

(12) United States Patent
Rust et al.

(10) Patent No.: US 7,124,364 B2
(45) Date of Patent: Oct. 17, 2006

(54) DATA DICTIONARY METHOD

(75) Inventors: Godfrey Rust, London (GB); Mark Bide, Camberley (GB); Steffen Lindek, Plankstadt (DE); Chris Barlas, London (GB)

(73) Assignee: Contecs:DD LLC, Washington, DC (US)

( * ) Notice: Subject to any disclaimer, the term of this patent is extended or adjusted under 35 U.S.C. 154(b) by 575 days.

(21) Appl. No.: 10/302,151

(22) Filed: Nov. 21, 2002

(65) Prior Publication Data

US 2003/0221171 A1  Nov. 27, 2003

Related U.S. Application Data

(60) Provisional application No. 60/331,807, filed on Nov. 21, 2001.

(51) Int. Cl.
    G06F 17/00 (2006.01)
(52) U.S. Cl. ........................ 715/532; 707/100
(58) Field of Classification Search ............. 715/532; 707/100
    See application file for complete search history.

(56) References Cited

U.S. PATENT DOCUMENTS

| 5,052,040 | A |   | 9/1991 | Preston et al. |
| 5,619,709 | A | * | 4/1997 | Caid et al. ............ 715/532 |
| 5,715,403 | A |   | 2/1998 | Stefik |
| 5,991,876 | A |   | 11/1999 | Johnson et al. |
| 6,046,394 | A |   | 4/2000 | Hino |
| 6,112,181 | A |   | 8/2000 | Shear et al. |
| 6,141,754 | A |   | 10/2000 | Choy |
| 6,269,356 | B1 | * | 7/2001 | Hatton ............... 706/55 |
| 6,286,010 | B1 | * | 9/2001 | Ramachandran et al. ......... 707/103 R |
| 6,529,864 | B1 | * | 3/2003 | Chase ............... 704/9 |
| 6,915,265 | B1 | * | 7/2005 | Johnson ............ 705/2 |
| 2002/0002674 | A1 |   | 1/2002 | Grimes et al. |

(Continued)

FOREIGN PATENT DOCUMENTS

JP        406289886      10/1994

(Continued)

OTHER PUBLICATIONS

Schneider, L.S., et al, "Data Base Design: Quantitative Data Description", Proceedings of the 1975 ACM SIGMOD International Conference on Management of Data, May 1975, pp. 167-185.*

(Continued)

Primary Examiner—William Bashore
Assistant Examiner—L. Ries
(74) Attorney, Agent, or Firm—Connolly Bove Lodge & Hutz LLP

(57) ABSTRACT

A method for creating a rights data dictionary for definition of terms of a rights expression language is disclosed. The data dictionary may be used in computer operations on rights expression metadata, such as for digital rights management applications. The data dictionary may also be used for translating between expressions in different rights expression languages, thereby enabling interoperability of rights expressions. The rights data dictionary is organized according to a hierarchical schema. Terms are added to the data dictionary according to specified rules that relate to a basic term set, and in particular, are begotten from act type terms. The schema includes a "context" term of the basic term set that is assigned a meaning signifying a circumstance in which at least the basic action occurs. Other terms may be developed from the context term and defined by their relationship to it.

21 Claims, 4 Drawing Sheets

U.S. PATENT DOCUMENTS

| | | | |
|---|---|---|---|
| 2002/0013783 A1* | 1/2002 | Rising et al. | 707/102 |
| 2002/0017557 A1 | 2/2002 | Henrick | |
| 2002/0019814 A1 | 2/2002 | Ganesan | |
| 2002/0026445 A1 | 2/2002 | Chica et al. | |
| 2002/0059290 A1* | 5/2002 | Rising, III | 707/102 |
| 2002/0073177 A1 | 6/2002 | Clark et al. | |
| 2002/0082997 A1 | 6/2002 | Kobata et al. | |
| 2002/0091584 A1 | 7/2002 | Clark et al. | |
| 2002/0109707 A1 | 8/2002 | Lao et al. | |
| 2002/0156712 A1 | 10/2002 | Rambhia | |
| 2002/0157002 A1 | 10/2002 | Messerges et al. | |
| 2003/0085997 A1* | 5/2003 | Takagi et al. | 348/143 |

FOREIGN PATENT DOCUMENTS

| | | |
|---|---|---|
| JP | 2000188702 | 1/2002 |

OTHER PUBLICATIONS

Herot, Christopher F., "Spatial Management of Data", ACM Transactions on Database Systems (TODS), vol. 5, Issue 4, Dec. 1980, pp. 493-513.*

Delatizky, Jonathan, et al, "APT—A Productivity Tool for Supporting Expert Analysis of Time Series Data", Proceedings of the 3rd International Conference on Industrial & Engineering Applications, vol. 1, Jun. 1990, pp. 478-484.*

Article entitled "Resource Description Framework (RDF) Model and Syntax Specification," published Feb. 22, 1990 by W3C.

Article entitled "Definition of the CIDOC Object-Oriented Conceptual Reference Model," published Jul. 2001 by the ICOM/CIDOC Documentation Standards Group.

Article entitled, "Reconciling MPEG-7 and MPEG-21 Semantics Through a Common Event-Aware Metadata Model," Jane Hunter, DSTC Pty Ltd., University of Qld, Australia, Arxiv, Oct. 22, 2002.

Article entitled, "The ABC Ontology and Model, " *Journal of Digital Information*, vol. 2, Issue 2, Nov. 2001.

Article entitled, "A Common Model to Support Interoperable Metadata," Bearman et al., *D-Lib Magazine*, Jan. 1999, vol. 5, No. 1.

Article entitled, "Putting Metadata to Rights", *Summary Final Report* Jun. 2000, Indecs.

Article entitled, "Principles, Model and Data Dictionary", Godfrey Rust and Mark Bide, Indecs Jun. 2000.

* cited by examiner

DATA DICTIONARY METHOD

CROSS-REFERENCE TO RELATED APPLICATION

This application claims priority pursuant to 35 U.S.C. § 119(e) to U.S. Provisional Application No. 60/331,807, filed Nov. 21, 2001, which application is specifically incorporated herein, in its entirety, by reference.

REFERENCE TO INCORPORATED TABLES

The document entitled Text of ISO/IEC CD 21000-Part 6—Rights Data Dictionary (RDD), dated Jul. 27, 2002, including all tables therein, is incorporated herein by reference. This document, including all of its tables and related textual information, is electronically submitted herewith pursuant to 37 C.F.R. § 1.52(e)(1)(iii), on duplicate CD-ROM disks each containing a single file named W4943.doc (4,762 KB). The copyright holder has no objection to the reproduction of copyrighted material from the incorporated document exactly as it may appear in a publication of this application by the United States Patent and Trademark Office or comparable foreign patenting authority, or in a patent that issues from this application, but otherwise reserves all rights whatsoever.

BACKGROUND OF THE INVENTION

1. Field of the Invention

The present invention relates to methods for creating a data dictionary for defining terms of a machine-readable rights expression language, such as a metadata rights expression language, and applications for such a data dictionary. In particular, the invention relates to applications and systems using a rights data dictionary to interpret a rights expression language, and for translating between rights expression languages.

2. Description of Related Art

Dictionaries have long been used to describe the use and meaning of words in natural languages. In the natural language context, dictionaries are primarily descriptive in nature, in that the definitions in the dictionary reflect the dictionary author's observations of how words are used in the human community to which the dictionary relates. As such, natural language dictionaries are descriptive in nature. Another aspect of natural language dictionaries is that many natural language words are commonly assigned multiple meanings. This aspect can, and often does, create ambiguity in human expression. At the same time, the scope of human expression is virtually unlimited, and natural language words may be found to express virtually every thought. Moreover, new words are constantly being created to express new concepts in living languages.

In contrast, in the machine (computer) language context, languages are created by design. "Machine language" refers not only to programming languages such as assembly language, 'C', Fortran, HTML, and the like, but also to descriptive languages such as rights expression languages. Dictionaries—sometimes also called schemas—of machine languages are primarily prescriptive data structures. That is, machine language dictionaries prescribe the meaning and relationships of machine language terms, usually in a precise and rigid manner. Consequently, machine language expressions are intended to be clear and unambiguous, although their scope is correspondingly limited.

Increasingly, opportunities lie at the interface between natural languages and traditional machine languages. As machines become ever more sophisticated and more involved in different aspects of human life, more complex machine languages have been developed, at least partially for descriptive purposes. Such languages are used to describe the status or attributes of different objects or processes, usually in a commercial or production context. In particular, applications for descriptive, machine-readable metadata in wide area networks continues to evolve.

For example, one recently developed application area for machine languages involves digital rights management. In digital rights management applications, intellectual property rights implicated by various types of digital works may be described using a specialized language for rights expression that is capable of being machine read, herein referred to as a "rights expression language." Digital rights expressions may be associated with products or content to which they pertain, so that appropriate actions may be automatically taken in respect of the products or content when the rights expressions are read by a suitable machine. Although the field is rapidly evolving, general concepts of digital rights management are well understood in the art. Other applications for machine-readable metadata in contexts like the World Wide Web and similar wide area networks include privacy rights, semantic-based search engines, library catalogs, and micro-payments ("digital cash").

Of course, intellectual property rights as used in digital rights management methods involve concepts that have evolved, and continue to evolve, in the natural language sphere. As such, expression of digital rights may involve expression of a very diverse and ever-changing range of ideas, at different levels of abstraction, with sometimes subtle distinctions between terms. Correctly interpreting and acting on even relatively simple expressions of intellectual property rights may be difficult using an inflexible machine language. Compounding this difficulty is the highly granular, transient, and transferable nature of many intellectual property rights. For example, a particular work may be a compilation of many component works. Component works, in turn, may be compilations of still further component works, and so forth. Some components may be copies, while others are transformations of some kind, which imply different types of rights. Each component work may have a unique collection of rights associated with it. Ownership and application of these rights may change as a function of time, location, and intervening transactions. Thus, a machine language for expression of rights should be capable of correctly expressing potentially very complex and subtle semantic content, without becoming overly cumbersome.

Various machine languages are known in the art for the expression of digital rights. For example, the Open Digital Rights Language (ODRL™) or the eXtensible rights Markup Language™ (XrML™), an Extensible Markup Language (XML) compatible grammar for general digital content. Languages such as these, and others known in the art, use resource-based models in their vocabulary schemas. For example, XrML™ is consistent with the Resource Description Framework (RDF) model and syntax published by W3C®. Such languages tend to be developed for a particular aspect of rights management in a particular context, and correspondingly, have limited vocabularies. They may also employ different terms to describe similar or logically overlapping circumstances, making translation between such languages difficult. Present rights expression languages employ resource-based schemas for expression of digital rights: most things are described as attributes or properties of resources.

Other term sets are also known for the purpose of describing rights, which may be used with, or interact with, rights expression languages in more limited applications. For example, the Online Information Exchange message format (ONIX) has been developed for use in connection with text-based products, including electronic books. In general, these types of term sets tend to be relatively non-hierarchical (i.e., "flat") and simple.

A resource-based data dictionary model may be described as resource-centric schema for developing metadata to describe attributes of the underlying resource. For example, resource-based metadata describing rights to an electronic resource, such as a copyrighted story, may be associated with the resource. The metadata may describe previous attributes that have arisen from previous actions associated with the resource; for example, "creation date" and "author" describe, respectively, a time and an agent of an authorship action. This approach works well so long as the point of view for which rights data is desired does not change. In practice however, to implement a sophisticated digital rights management scheme, data from various different points of view is needed.

For example, it may be desirable to gather metadata from the point of view of various agents, including authors or creators, publishers, replicators, consumers, clearing houses, etc, and various other resources for which a resource is a parent or source, in whole or in part. For example, if a particular resource is copied to a replica, metadata may be associated with the replica, indicating that the replica is a copy of a particular source, when the replica was made, who made the replica, and where the replica was made. At the same time, additional metadata may be associated with the source, indicating that a copy was made, when a copy was made, who did the copying, where the copying occurred, and the identity of the resulting replica. The relationship "is a copy of" in the phrase "B is a copy of A" is distinct from the relationship "has a copy" in the phrase "A has a copy B." For further example, "C copied A"—a statement from the point of view of an agent 'C'—is distinct from "A was copied by C," from the point of view of a copied resource A.

Hence, the resource-based model, because it describes rights from the point of view of different resources, accordingly will use a different or modified term to describe essentially the same action, depending on which resource provides the operative point of view. In a digital universe where resources are propagated, combined, divided, embedded, mutated and otherwise transformed in a variety of different ways, this may lead to an undesirably complex terms and expressions in many situations. Similar complexity may accrue in the context of other descriptive metadata applications, as well.

It is desirable, therefore, to provide a more robust yet conceptually elegant data dictionary (i.e., a dictionary-like schema or data structure) that is capable supporting a language for conveying complex semantic content as needed for digital rights management, and other sophisticated applications for metadata. At the same time, however, resource-based descriptive schemas are already entrenched in several rights descriptive languages, and good reasons exist to believe that resource-based descriptive languages will continue to be created, evolve, and grow for use in rights management and many other applications. Accordingly, the robust data dictionary should be fully compatible with resource-based schemas. Terms developed using the new data dictionary should be capable of being unambiguously mapped to terms developed according to resource-based descriptive models, so that the data dictionary may be used to translate between different rights expression languages. In addition, terms developed using the schema should have unique, unambiguous meanings, and it should be possible to generate an expandable, open database of terms consistent with the schema. It is further desirable to provide an expandable, open database of terms for use in digital rights management.

SUMMARY OF THE INVENTION

The present invention provides a robust and elegant schema for constructing a data dictionary for use in digital rights management. The term "data dictionary" is used herein to signify a dictionary-like schema or data structure that is machine-readable. It may also incorporate other meanings of "data dictionary" as generally understood by those of ordinary skill in metadata expression languages, such as rights expression languages for digital rights management, and other computing language applications. The data structure is open, yet provides for interoperability with rights management languages, whether or not based on a resource-centric model. It is anticipated that the schema may also be used to develop data structures for other applications requiring highly descriptive, unambiguous, and interoperable machine readable expressions, as well.

The schema is organized according to an innovative data model, referred to herein as the "context model." The context model enables the building of term sets according to a well-defined set of rules that results in a hierarchical data structure. Features of the context model include the way in which semantic relationships between terms are defined, using core terms and rules for adding new terms.

The term-building rules of the context model may be used to provide virtually any desired term set in which every term has a defined relationship to every other term in the set. In other words, every term has a unique place within a logical hierarchy, analogous to a family tree or genealogy. The hierarchical or tree structure, which logically resembles a family tree, arises from rules for creation of new terms. Every new term is at least partially derived from another term. That is, every new term has at least one "parent." Hence, every term may have, to carry the analogy further, siblings, parents, cousins, children, and so forth—in other words, every term stands in a defined web of relationships to other terms created according to the schema. New terms may also be derived by aggregating terms from different branches of the family tree, thereby creating relationships across branches.

In an embodiment of the invention, the schema utilizes a single original term, or "first term," that has no parent term. As such, the first term is defined self-referentially. Although the intended meaning of the first term may be clarified using a natural language expression, such clarification has the nature of a comment. The first term is assigned a meaning consistent with the application for which the resulting data structure is intended. For example, for digital rights management, a first term "Act" may be assigned a meaning of "to act," with a comment of "act includes every type of verb, including passive verbs, intransitive verbs, and static verbs (such as 'have')." The particular meaning of the term is not critical, only that it is a verb. For example, terms such as "is" or "do" may also be suitable, so long as all verbs needed for the intended data structure are generally described thereby. The term "Act" or a similar generalized verb is believed suitable for digital rights management data structures, and perhaps other applications. In addition, it may also be possible to develop a useful data structure using more than one first term.

It should be appreciated that any particular symbology may used to represent the first term and any other term of the data structure, so long as each term is unique. For example, each term may be a unique machine-readable number or code. Each term may optionally be assigned a headword, which should describe or suggest the term's assigned meaning. For example, "Act" describes, or at least suggests, the term's intended meaning within the data structure. Of course, headwords need not be expressed in any particular natural language (i.e., Spanish, Mandarin or words in any other language would do as well as English). Although it is often convenient to loosely refer to a headword as "term," a "term" is more accurately as a unique collection of attributes representing an underlying meaning. In other words, headwords are merely convenient natural-language names for terms, and are themselves more accurately considered attributes of terms.

Every other term of the data dictionary is then defined partially with respect to the first term, or with respect to other partially derived terms. In an embodiment of the invention, sometimes referred to as using a "context model," further rules involving a set of "basic terms" are prescribed to govern addition of derived terms in a data structure. Like the first term, the basic terms are selected as generic terms from which other terms of a desired set may be derived. The five basic terms below are used for developing data structures for digital rights management applications:

| Headword | Description |
|---|---|
| Context | Circumstances in which Acting occurs |
| Agent | An entity that Acts |
| Time | Temporal parameters of a Context |
| Place | Spatial parameters of a Context |
| Resource | An entity involved in a Context, that is not an Agent, Time, or Place. |

Each basic term is partially derived from the first term "Act." The terms of Time, Place, and Resource are derived from Act, and related together in Context. The Context is the sum of these parts. The five basic terms listed above are believed to provide a conceptually elegant framework for spawning semantically rich and complex data structures for use with rights expression languages.

Further terms are then generated, i.e., derived as a type from the first term. According the context model, types of the first term are verbs describing various actions; that is, "action terms." For example, the verb "Do" may be derived as a type of Act; "Make," in turn, may be derived as a type of Do; "Derive" may be derived as a type of Make; "Copy" may be derived as a type of Derive; and so forth. Each term is derived by adding some element of new basic semantic meaning to its parent. For example, to "Adapt" may be a child of "Derive", meaning "To Derive by making changes". It should be apparent that virtually any action term might be derived in a similar manner. Also, the resulting data structure will conform to a hierarchical logical tree with the first term at its apex.

Families of terms, in turn, may be begotten from any action term. To beget as used herein means to bring a new term into being by application of the context model. According to the context model, a family of terms is begotten by combining any action term with the basic terms. For example, the action term "Copy" when combined with the basic term "Context" begets the new term "CopyingEvent," which is a type of context. Similarly, when combined with "Agent," Copy may beget "Copier"—a type of Agent that copies. Combined with "Resource," Copy may beget multiple terms "Replica," "SourceofCopying" and "CopyingTool"—all types of Resource. Further terms may be begotten by a combination with the basic terms "Time" and "Place." It should be apparent that terms begotten from action verbs will also reside in the logical tree resulting from the begetting of action terms.

In addition to the first term and the basic terms, the context model also makes use of a defined set of relating terms. Relating terms may be used to describe semantic relationships between two terms. In the context model, every term has, by definition, at least one defined relationship with another term within the data structure. Accordingly, relating terms are begotten as needed to describe these relationships. For example, the relating term "HasAgentType" may be used to link an agent, such as "Copier," to a context, such as "CopyingEvent." Another relating term is "HasValue," which links a term to a value of it. For example, the term Copier may have a value of "John Doe." Other relating terms may also be provided. It should be apparent that, because they are begotten from relationships between unique terms, relating terms are themselves unique and conform to the logical tree structure resulting from application of the context model. Relating terms form part of the action families begotten from action terms.

Thus, an adaptable hierarchical dictionary-like data structure may be constructed using the context model for various applications. The resulting data structure may be compatible with more than one expression language, for example, the rights expression languages ODRL™ and XrML®. The data structure may be used to interpret expressions that use its terms. It may also be used to translate from one expression language into another. Because each term generated by the context model is unique and has a single meaning, and because the dictionary can be extended to any possible level of granularity, it is particularly suitable for mapping terms from a variety of different expression languages for translation purposes. Accordingly, the invention further provides a method for mapping between expression languages using a data dictionary.

A more complete understanding of the adaptable hierarchical dictionary system, and applications for it, will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method for creating a data dictionary, and applications for the data dictionary. In the detailed description that follows, like element numerals are used to describe like elements appearing in one or more of the figures. Likewise, the tables referenced below are presented together in a section at the end of the detailed description.

Figure 1:
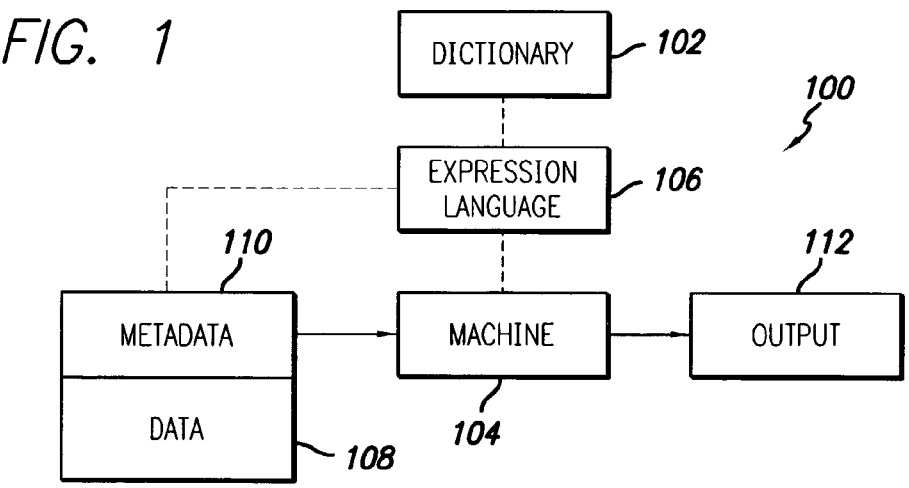
FIG. 1 is a diagram showing an exemplary system employing a data dictionary.

An exemplary system 100 employing a data dictionary 102 is shown in FIG. 1. Other elements of system 100 include a computing machine 104, an expression language 106, data 108, metadata 110, and output 112. Data 108 and its associated metadata 110 may be in any suitable format as known in the art. Data 108 may include digital content that implicates one or more intellectual property rights. It may be desirable to distribute such data over a wide area network such that any requirements arising from its associated intellectual property rights are met. This may include transferring the data across media types; for example, part of a digital music file may be excised, altered, and embedded into a motion picture format. Data 108 may also include other forms of data such as process information.

Metadata 110 is associated with data 108 and contains information relating to data 108. For rights management, metadata 110 may include a description of the intellectual property rights and related information pertaining to data 108. Various methods for associated data and metadata are known in the art, for rights management and other applications. Any suitable method may be used.

Metadata 110 is formulated according to an expression language 106. As metadata 110 is in some sense descriptive in nature (it describes data 108), the expression language 106 is capable of expressing descriptive material. In the case of rights management, a language such as XrML® may be used, or any other suitable expression language. Terms of the expression language 106 are defined in accordance with a data dictionary 102. Data dictionary 102 supplies the semantic material underlying terms that may be used with the expression language. When metadata 110 is created, a selected expression language 106 and data dictionary 102 are operatively adopted by formulating the metadata in accordance with the selected language and data dictionary. Similarly, computer 104 may be programmed to parse metadata 110 according to the same selected language 106.

Machine 104 provides an intended output 112 in accordance with the semantic content of metadata 110. Computing machine 104 may include any type of general-purpose or special-purpose computing device that is capable of reading and parsing metadata 110, and providing some useful output. Output 112 may take any desired form. For example, the output may comprise a record, or a message. Another example would be a translation of metadata 110 into a second expression language. Output 112 is determined, at least in part, by metadata 110, as interpreted in accordance with terms defined by data dictionary 102.

Figure 2:
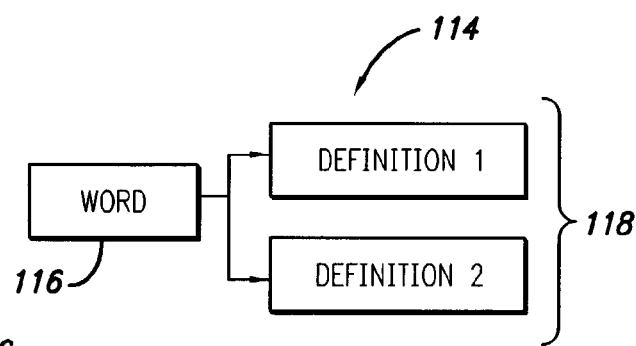
FIG. 2 is a diagram of dictionary term according to prior art.

Data dictionary 102 comprises a plurality of terms, each assigned a unique combination of attributes and defining a single meaning. This may be compared to a traditional dictionary 114, wherein a single word 116 can be assigned a plurality of definitions 118, as shown in FIG. 2. Each definition may describe a distinctly different meaning, which the same word may denote in different uses. A traditional dictionary may also include other attributes (not shown) of its terms.

In an embodiment of the invention, a rights data dictionary is provided, comprising a plurality of terms, each with a defined set of attributes 120. Attributes 120 may be classed into two classes: a class of non-optional attributes 122 and a class of optional attributes 124. Attributes 120 may also include other classes, such as a class of relationships between attributes of a term.

Attributes are defined by an authority, which may be defined as an agent responsible for ascribing an attribute to a term or to another attribute. For the purposes of the examples and tables herein, the authority for the rights data dictionary is generally treated as a single authority, sometime referred to herein as an "Rdd Authority," unless otherwise specified. However, one of the advantages of the rights data dictionary is that attributes and terms may be defined by different authorities, to enable interoperability between different expression languages and term sets for different applications.

Each term of the rights data dictionary should include exactly one unique identifier attribute 126. Any identification system may be used, so long as it provides an exclusive set of unique term identifiers within the dictionary. That is, every term has a different identifier. It may be desirable to provide identifiers for a dictionary according to a predetermined scheme or pattern; for example, sequential numbers. It may comprise a machine-readable code. To ensure that each identifier is unique, assignment of identifiers may be under the control of a single authority. An identifier 126 is one of the non-optional attributes 122. Its uniqueness ensures that the semantic content of the data dictionary can be unambiguously mapped.

A term status attribute 128 comprises another one of the non-optional class 122 of attributes. It is non-optional, but not in the sense of being essential or required. Rather, it may be an inherent or assumed property of a term. For example, if there is no explicit status attribute 128, every term of the data dictionary may be assumed to have the same status. In an embodiment of the invention, the status attribute denotes an authorization level. For example, a rights data dictionary may include terms with different authorizations levels, such as standardized terms, adopted terms, mapped terms, and isolated terms. Hence, the status attribute may be useful for term management, but is not intended to provide semantic material to a term. Further description of a status attribute, and in particular, allowed values for it according to an embodiment of a rights data dictionary, is provided in Table I below.

Another attribute in the non-optional class 122 may be the meaning type attribute 130. Like the status attribute, meaning type may be understood as an inherent term property more so than as a necessary semantic feature. In the rights data dictionary, the meaning type attribute 130 merely describes whether the term has an original (non-derived) meaning, a partly derived meaning, or a wholly derived meaning. The data dictionary includes at least one term with original meaning, called a "first term." In the rights data dictionary, there is a single first term "Act," defined self-referentially as "to act." All other terms of the dictionary derive meaning, in whole or in part, from other terms. A term that derives its meaning partially from another term would have a type attribute 130 of "partly derived meaning." A term that derives meaning wholly from other terms, e.g., combinations of other terms, would have a type attribute of "wholly derived meaning." Table II below describes further information relating to meaning types in an exemplary rights data dictionary.

The history attribute 132, also called an audit attribute, is another in the non-optional class used for term management, and not for conveying meaning. The history or audit attribute records the circumstances, e.g., time and authority, of term additions or modifications. In this sense, it is related as a source of term status 128. It may be useful in maintenance of the dictionary. Further description of audit attributes is set forth in Table III below.

The remainder of the term is comprised of optional attributes 124. These attributes are optional only in the sense that some terms may lack them, and yet still be terms within the rights data dictionary. On the other hand, many of these "optional" attributes 124 are convey essential semantic material, without which the data dictionary could not function. Therefore, some of these term attributes, although optional with respect to any particular term, may be required for the data dictionary. Such attributes may be considered core functional attributes. Most terms in an efficient dictionary will include such attributes. Core functional attributes are discussed below in connection with FIG. 4. The concept of core functional attributes may be helpful for better understanding the rights data dictionary, but need not be strictly defined as a class, type, or other attribute within the data dictionary itself.

Figure 4:
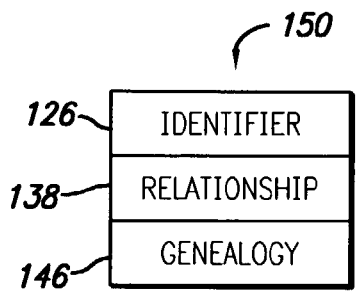
FIG. 4 is a diagram showing core attributes of a term according to an exemplary data dictionary.

With reference to FIG. 4, core functional attributes 150 for a wholly derived term may include a unique identifier 126, one or more relationships 138, and a genealogy 146. These attributes alone impart an unique identity to a term, and impart a functional semantic content. In the case of a partly derived term, core functional attributes include all of the foregoing, and a definition or other term description that defines the semantic content of the term to the extent that it is not derived from other terms within the dictionary. A definition may be provided using a suitable natural language expression. With respect to a term having original meaning, core functional components include the identifier 126 and a definition, which in case of the first tem "Act," is defined self-referentially. Likewise, an isolated term is essentially comprised of an identifier and a definition, which however is defined using a suitable natural language expression, or by some other reference to semantic content outside of the data dictionary.

Figure 3:
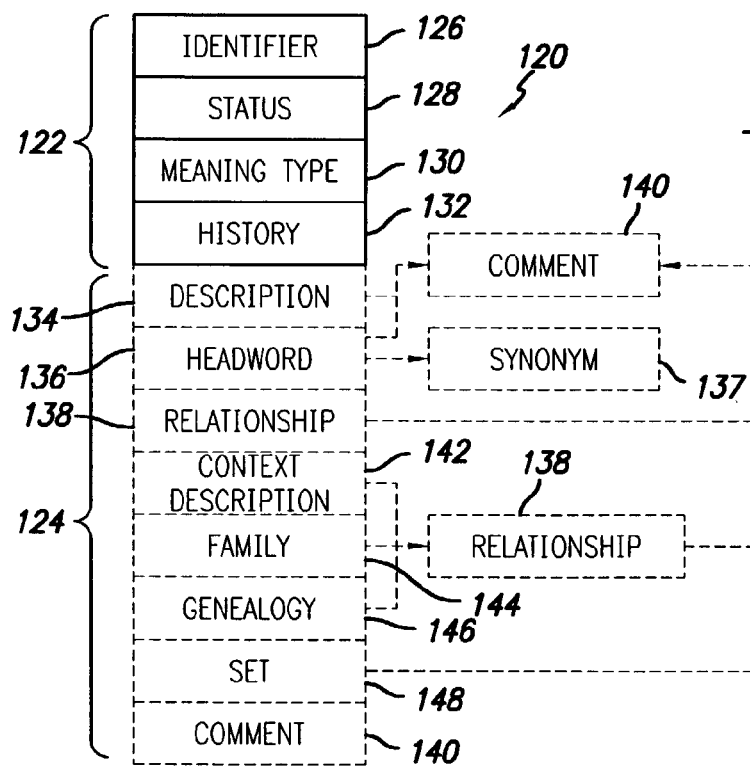
FIG. 3 is a diagram of an exemplary data dictionary term according to the invention.

Referring again to FIG. 3, optional attributes 124 include a term description attribute 130. A term description is generally defined as a natural language statement of the meaning of a term. A statement of definition is one example. A term description may have multiple definitions (for example, in different natural languages, or under different authorities), but all should describe an identical meaning. If different meanings are allowed, the dictionary may no longer be useful for unambiguous mapping of semantic material, which would be undesirable.

Descriptions 134 may also include any desired number of comments 140. Comments include any desired explanatory material. More precisely, a comment is defined as a natural language annotation of something for the purpose of amplification or clarification of its meaning. Comments may be associated with various attributes, or with a term as a whole. Further details regarding comments are provided below in Table IV. Further description of term descriptions according to an exemplary embodiment of the rights data dictionary are set forth in Table V below.

On of the advantages of the rights data dictionary is that it may include terms originating in any number of natural languages. One way that natural languages may be mapped using the data dictionary is by the use of a language attribute. The language attribute is an "attribute of an attribute," in the sense that it applies to textual attributes and not to whole terms, per se. The language attribute (not shown) merely specifies the natural language of textual material. Further details regarding language attributes in a rights data dictionary according to the invention may be found in Table VI below.

Term descriptions may have various types, as may be determined by a standard authority for the dictionary. Term description types for an exemplary rights data dictionary according to the invention are set forth below in Table VII. It should be apparent from the table that a definition is a type of term description. Other things that may be included in term descriptions include illustrative examples or explanatory comments. Wholly derived terms need not be provided with a definition, as their meaning may be determined from other terms. Other terms, however, import at least a portion of their meaning from an external language. The definition can be used to import external meaning into a term and should be present in partially derived terms. Further description of term description types in an exemplary rights data dictionary is provided below in Table VII.

Referring again to FIG. 3, term attributes 120 may include a headword 136. A headword is generally described as a human-readable name for a term. Different headwords may be assigned to a term, such as by different authorities. These are regarded as synonyms 137. Although headwords may commonly be selected to suggest a term's meaning, they are attributes for convenience only, and perform no semantic function. A single unique headword for each term, for a given natural language, will generally be preferable within a single authority. The use of multiple synonyms permits people to conveniently identify terms across different authorities and using different natural languages. Headwords according to an exemplary embodiment of the invention are further described in Table VIII below. Synonyms according to an exemplary embodiment of the right data dictionary are further described in Table IX below.

Referring again to FIG. 3, term attributes may also include one or more relationship attributes 138. A relationship may be generally described as a situation in which an entity is related to an attribute by a relating term. Every term of the dictionary, other than an isolated term, has a defined relationship with another term (other than an isolated term) within the dictionary. Often, a term will have multiple relationship attributes to describe its relationships to multiple terms. A relationship attribute 138 should be expressed using a defined set of rules and syntax. For example, "[Term 1][Has Relationship 'X' To][Term 2]," is an form of expression sometimes called a "triple."

Relationships may be considered a form of semantic content for a term. Wholly derived terms may be defined entirely by relationships to other terms in the dictionary, which may obviate any need for a definition of such terms. Relationships also describe a "parent" term's relationship to its "children." Hence, a term's genealogy is a set of relationships. Also, it is axiomatic that every relationship has a reciprocal relationship. For example, the relationship "Term 1 is parent of Term 2" has the reciprocal relationship "Term 2 is child of Term 1." One or more comments 140 may be associated with a relationship attribute 138, for explanatory purposes. Other properties of relationships include the following limitations: each relationship is (a) one-to-one (not one-to-many or many-to-many); (b) has no place parameters (i.e., is assumed to be universal in terms of place); and (c) has only a single pair of time parameters (i.e., a start time and an end time).

When relationships are grouped in genealogies or context descriptions, arbitrary values may be assigned to Term1 and/or Term2 in each triple to support the further logical relationships which may be required for a complete description. Arbitrary values are unique and valid only within a specific genealogy or context description. They may be particularly useful in connection with specialized context families. Further description of relationships according to an exemplary rights data dictionary are set forth below in Tables X–XI.

Attributes may further include exactly one context description attribute 142. A context description is defined as a group of relationships describing the attributes of a context. Hence, this attribute is applicable to terms that describe a context, and not other terms. Also, it is made up of other attributes, namely other relationships 138. Specific relationships within a context description are further described below in connection with FIG. 7.

The family attribute 144 and genealogy 146 are also "optional" attributes comprised of relationships. Family 144 is defined as a group of relationships 138 that determine attribute inheritance from one term to others according to the context model. One example of a family would be an action family, that comprises the relationships between an act type and the terms that it begets through the application of the context model. In an embodiment of the invention, an action family automatically begets all possible terms according to its structure, while a context family (which is a type of relationship family) only begets new terms when they are required to support mapping or other dictionary functions. In the alternative, terms for both types of families may be begotten on an "as needed" basis, to prevent needless proliferation of terms.

Figure 5:
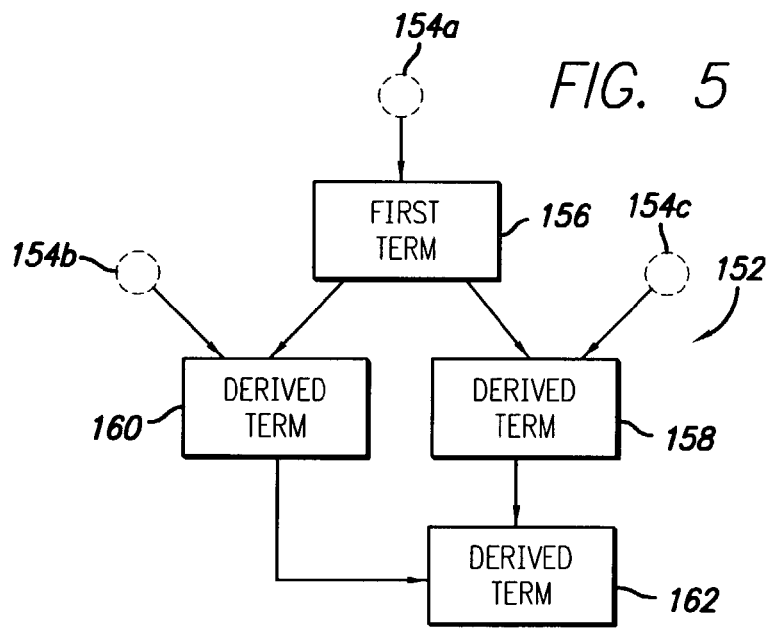
FIG. 5 is a diagram showing an exemplary term genealogy.

Hence, family 144 and context 142 reflect applications of the context model. In contrast, genealogy 146 is defined as a group of relationships that determine derivation of meaning for a term and which are true regardless of context. Thus, genealogy is independent of the context model, although it of course may include relationships created by the context model. FIG. 5 shows a logical structure of an exemplary genealogy 152 for a derived term 162. Inheritance relationships are indicated by the arrows connecting the enumerated elements of the figure. A first term 156 has an original meaning; i.e., is defined self-referentially. In a sense, it derives meaning from an external natural language source 154a, such as might be used in a term description. Derived terms 160, 158 both inherit meaning from the first term and from external sources 154b, 154c, respectively. Derived term 162 is a wholly derived term, and inherits its meaning entirely from terms 160 and 158. Hence, in the foregoing example the semantic content of 162 is determined by its genealogy, once the meanings of its parents are known. In this sense, a genealogy may sometimes be regarded as a rules-based hierarchical definition. Such a definition may be helpful for mapping terms from different expression languages.

In the most general sense, a genealogy comprises a set of relationships that includes the entire parental family tree of a term. In practice, however, it may be desirable to place some arbitrary limits on the label "genealogy" in order to limit genealogy set size. In an embodiment of a data dictionary according to the context model, a genealogy may be limited according to the following rule: each genealogy (except for that of the first term) shall contain at least one of the primary relationships containing one of the relating terms set out in Table XII below. Each genealogy includes no more than one relationship from Group A. Where a genealogy contains a relationship from Group A, it shall also contain at least one relationship from Group B.

It may be desirable in the construction of a data dictionary to further adopt a rule that every mapped term of the data dictionary should have a genealogy containing at least one inheritance relationship that is not constrained by the precision value "approximate," as opposed to "equal to," "exactly," and so forth. The purpose of this rule is to support mapping of terms in both tentative and definite ways. For example, a term "writer" may be similar to, but not exactly the same as "author." If "author" is a type of "creator," then the following pair of relationships may be given as the genealogy for "writer" (relationship syntax is that of the exemplary rights data dictionary):

1 FOO:WRITER→IsTYPEOF→CREATOR
2 FOO:WRITER→IsEQUALTO→AUTHOR [prec:APPROXIMATE].

Relating terms also have genealogies. Each genealogy of a relating term should contain exactly one relationship using each of the relating terms "relating from" "relating to" and "reciprocal of." An illustrative example from the exemplary rights data dictionary is set out in Table XIII below. This rule helps ensure that relationships in a data dictionary are correctly defined.

A genealogy may contain any other relationships that apply universally and result in the inheritance or constraint of meaning for a term. These include, for example, ascriptive and possessive relationships. The relationships, in turn, may have other relationships to support the description of intermediate steps required to establish universal meaning or constraint. Arbitrary values may be used and Types may be substituted for parent values for either Term1 or Term 2 of the Relationship. Examples of the use of relationships in genealogies, taken from the exemplary rights data dictionary, are set forth below:

PLACEOFCOPYINGFROM→IsPARTOF→PLACEOFCOPYING
MANIFESTATION→Is→PERCEIVABLE
TOOL→IsA→HUMANBEING [true:NEVER]
n DENIEDRESOURCE→IsACLASSFROM→TERMSET_1

The example below, also taken from the exemplary rights data dictionary, illustrates a possible genealogy from a mapped term adopted from an existing external term set (i.e., ONIX):

Possible Genealogy for the term "onix:ReplacesISBN"
1 onix:ReplacesISBN→IsTYPEOF→IDENTIFIER
2 onix:ReplacesISBN→HASPROGENITOR→RESOURCE
3 onix:ReplacesISBN [#1]→IsIDENTIFIEROF→IDENTIFIEDRESOURCE [#2]
4 REPLACEMENT [#2]→IsReplacementOf→REPLACEDRESOURCE [#3]
5 IDENTIFIEDRESOURCE [#3]→HASIDENTIFIER→ISBN [#1].

This example shows that that the value [#1] of the term "onix:ReplacesISBN" for one resource is identical to the value [#1] of the ISBN for the resource it replaces. Hence, the benefit of a rules-based genealogy for mapping semantic content should be apparent. Further illustrative examples of genealogies for various selected terms from the exemplary rights data dictionary are set forth below in Table XIV below.

Figure 6:
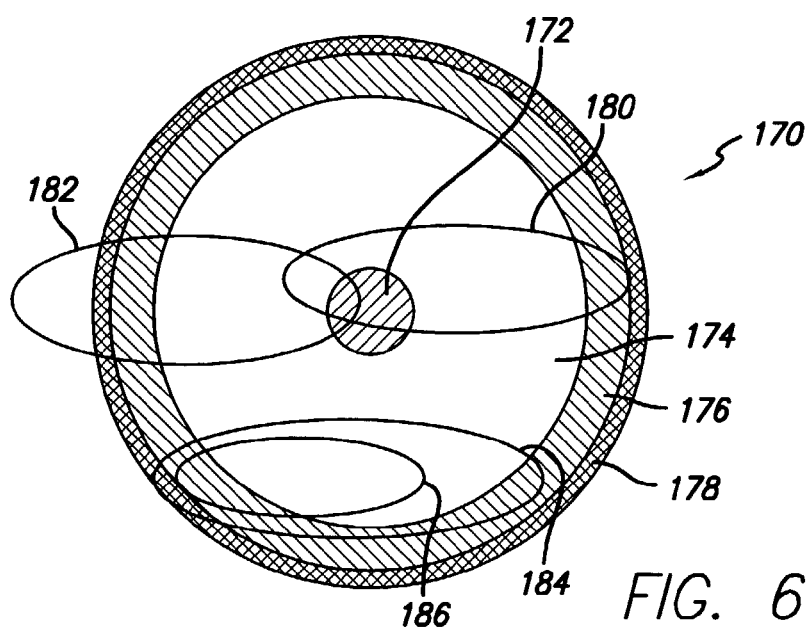
FIG. 6 is a diagram of a term set of an exemplary data dictionary, illustrating relationships to other term sets.

Referring again to FIG. 3, other attributes of a term may include one or more term set identity attributes 148. This attribute may identifies a term set or sets to which the term belongs, if any. Term sets may be established within the data dictionary for any desired purpose. One reason for a term set is to identify terms that are adopted from other expression languages. This may include terms that are mapped to standard terms as well as others that are isolated, i.e., unmapped. FIG. 6 illustrates examples of term set relationships within a rights data dictionary 170. Dictionary 170 comprises various term types, including regions corresponding to standardized terms 172, native or adopted terms 174, non-native, non-adopted mapped terms 176, and isolated terms 178. The relative sizes of these term-type regions is arbitrary. Different term sets 180, 182, 184, 186 may co-exist within the data dictionary, variously overlapping with each other and including various types of terms. For example, term set 180 includes terms of every type except for isolated terms 178. Term set 182 partially overlaps set 180, includes isolated terms, and includes other terms outside of the data dictionary 170. Term set 184 includes every type of term. Term set 186 is completely overlapped by set 184, and is a subset of both set 184 and dictionary 170. Various other relationships may also be possible.

Figure 7:
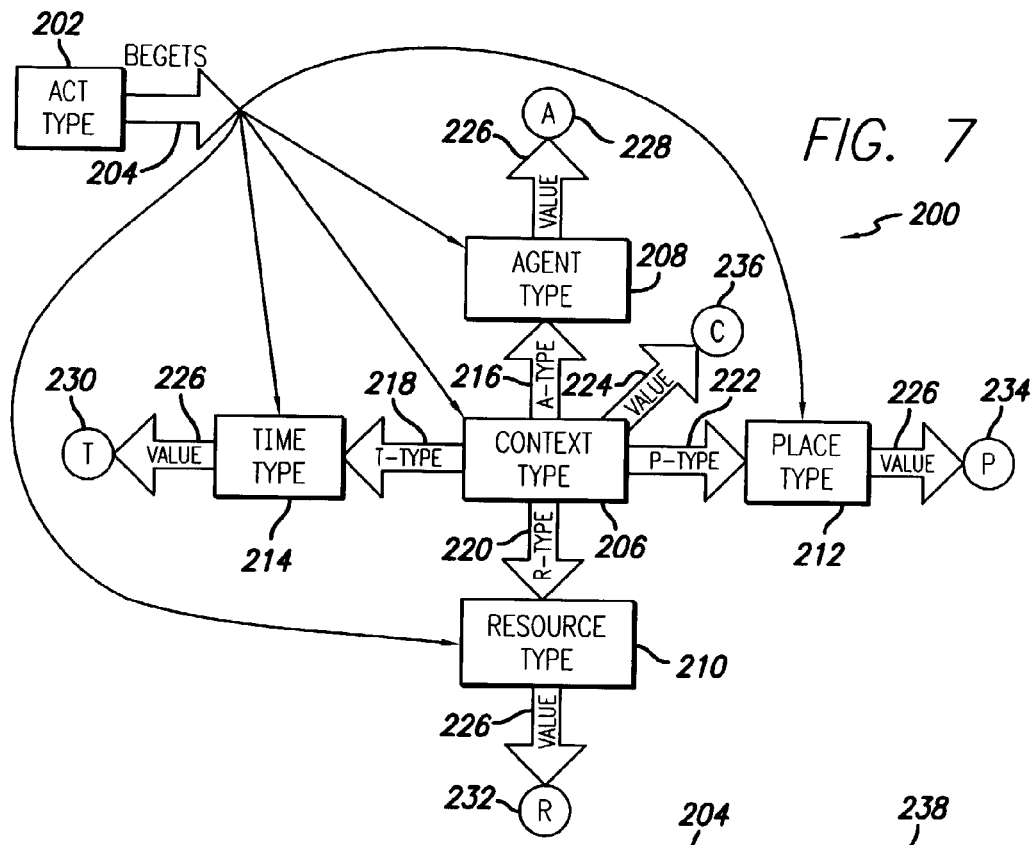
FIG. 7 is a diagram showing exemplary aspects of a context model.

As explained above, many new terms in a rights data dictionary are begotten by application of the context model, or derived from terms so begotten. FIG. 7 illustrates how an act type term 202 is used to beget an action family, and the group of relationships making up a context 200. Act type 202 is by definition a type of act; it is related to the first term of the rights data dictionary by a genealogy, such as "copy" is-type-of "derive" is-type-of "make" is-type-of "do" is-type-of "act." Act type 202 "begets" 204 a related set of basic term types and, indirectly, their inter-relationships.

Hence, the structure of an action family is derived from the context model, which defines a group of five terms (the basic term set) with associated types and relating terms whose application to a specific act type or context type results in the definition of a family group of new terms with inherited (at least partially derived) meanings. Properties of the basic term set according to an exemplary rights data dictionary are described in Table XV below.

Basic terms may have related basic term types. Examples of basic term types according to an exemplary rights data dictionary are set forth below in Table XVI. It should be apparent from the examples in the foregoing table that basic term types are begotten from a related verb type (act type) by application of the context model. Thus, basic term types begotten from a particular act type are members of an action family belonging to that act type.

Application of the context model as shown in FIG. 7 introduces five basic relating terms 216, 218, 220, 222, and 224 that account for the relationships between the context term and the other terms in the basic term set, and between each basic term and a value for it. These relating terms are also used to describe relationships between types of basic terms within any action family. For example, agent type 208 is an agent that performs an act specified by the act type 202. Note that this is expressed as a link between a context type 206 and an agent type. There are no relating terms other than the "begetting" term 204 between the act type 202 and the basic term types 206, 208, 210, 212, and 214. Instead, the relating terms 216, 218, 220, 222, and 224 describe relationships between a context term and each relating term. The context term may therefore be described as the hub of a hub-and-spoke system; hence the name "context model." This logical structure—placing an action within a context and then relating other terms to the context—is believed to provide greater efficiency than a resource-centric model in the number and complexity of relating terms needed to describe complex situations, particularly for rights management applications.

Another type of relating term concerns values of the basic term types. For example, agent type 208 may be linked by a "has value" relating term 226 to a value 228. Value 228 may be an identifier or other name for an agent. For further example, a time type 214 may be linked by a "has value" relating term to a specific time value 230, context to a context value 236, place to a location value 238, and resource to a resource value 232. Further examples and description of relating terms according to an exemplary embodiment is set out in Table XVII below. An example of a specific application of the context model to create an action family in provided in Table XVIII, also below.

Figure 8:
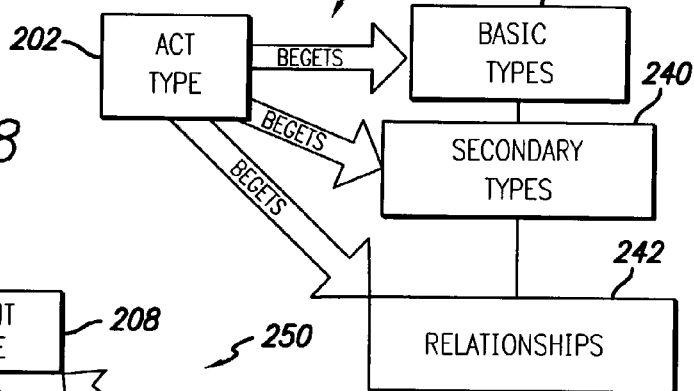
FIG. 8 is a diagram showing another exemplary aspect of a context model.

FIG. 8 illustrates the point that the terms in an action family may be classified in to different types. Act type 202 may beget 204 basic term types 238, secondary term types 240, and relationship term types 242. It may be helpful to keep these distinctions in mind while considering the various terms in an action family. It should also be remembered that an action family may include different types of any particular type. For example, an action family may include more than one type of resource, and more than one type of relationship.

As shown in FIG. 7, an act type 202 begets a context type 206. In addition, act types in situations (e.g., the act types "have," "exist," "have name," etc.) may be begotten from their contexts to express results of events. In addition, types of contexts may be created for complex or special situations. One such term type is "state." A "state" may be basically defined as a context in which nothing changes, resulting from an event. Therefore, an event type (or its underlying act type) may beget one or more state types. In addition, a state may be described by one or more relationships, and each act type may beget one or more state types. In addition, for the description of a state with more complex attributes, relationships may be combined into a type of context called a "situation."

"Status" is another type of term type begotten from act types. Status may be defined as an adjectival qualifier describing the past, present or possible future condition of an entity as a result of its role as a type of agent or resource. As in the exemplary data dictionary, an act type may beget status types as set out in Table XIX below. In the exemplary embodiment of the rights data dictionary, a status term tells whether something has been, is being or has the potential to be something else. It can apply to each of the term types of the context model, and includes the present and past participle forms of verbs (for example, "used" and "using"), and the potential form "usable." Further description and examples of status terms are set forth in Table XX below. In addition, each act type may beget state types in the form of "situations." As a result, an action family may contain relationships in the following form (examples of "situation" relationships according to the context model):

Do→BegetsStateType→Situation

Make→BegetsStateType→Existence

Name→BegetsStateType→Nomination.

Referring again to FIG. 7, status types may apply to each agent type 208, resource type 210, time type 214 and place type 212 in an action family. Status type for agent type and resource types begotten from the first term "Act" in the exemplary rights data dictionary are shown in Table XXI below. Other status types begotten from act types are types of these terms. With respect to place and time terms, requirements for status types are marginal and so standardized terms have only been introduced for agent types and resource types. Examples of status type relationships are provided in Table XXII below.

Figure 9:
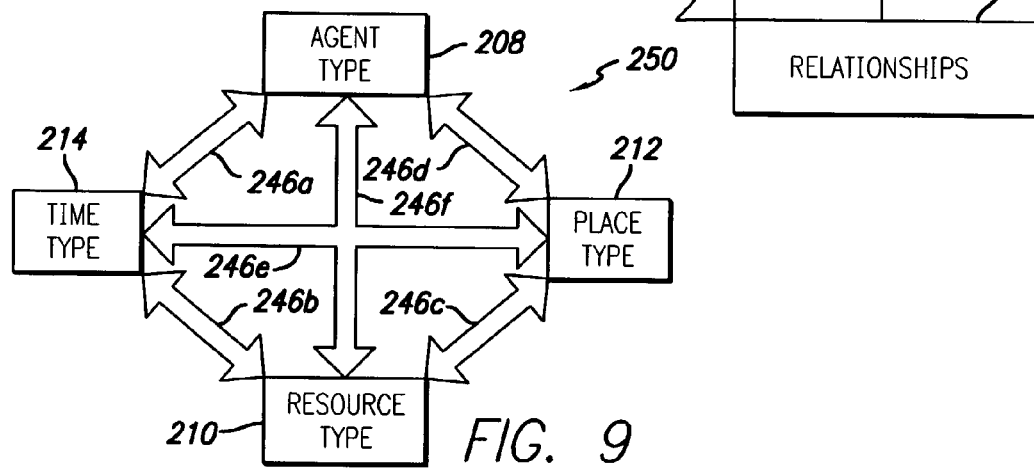
FIG. 9 is a diagram showing another exemplary aspect of a context model.

An alternative way of describing the semantics of a context is an Action Family Relating View (AFRV). A diagram of an exemplary AFRV 250 is shown in FIG. 9. The AFRV may be regarded as a group of relationships needed to relate terms of a family, when the context term is removed. In other words, the context term at the logical hub of a hub-and-spoke relationship structure is removed, and the remaining terms 208, 212, 210, and 212 are related with new relating terms 246a–f, which collectively preserve the total semantic value of the context. When the action family is relatively small, this can be done without generating an large number of relating terms; however, as the size of an action family increases, the number of relating terms needed in an AFRV increases in geometric progression with the terms to be related. It should be appreciated that an action family may include more than four terms shown in FIG. 9; for example, it may include multiple resource terms.

Relating terms in an AFRV may be begotten as follows. Each act type may beget an AFRV containing any or all of the one-to-one relationships that may exist between elements of the context model. As a result, an action family may contain relationships which include AFRV relating terms. However, AFRV relating terms do not need to be begotten routinely for all act types. A data dictionary may be populated with them as they become required to support the mapping of terms from other authorities, i.e., different expression languages mapped in the dictionary. An example of the relating terms begotten from the first term Act are shown in Table XXIII below. All other relating terms begotten from act types are types of the terms shown in Table XXIII, in an exemplary embodiment. An exemplary action family that includes AFRV relating terms from the exemplary rights data dictionary is set out in Table XXIV below.

With respect to action families, for each specified action family or AFRV relationship, a reciprocal relationship must exist in an appropriate form. Examples of appropriate forms for reciprocal relationships are set forth in Table XXV below. Reciprocal relationships enable semantic content to expressed from any desired point of view. Such relationships may therefore facilitate mapping between expression languages that are based on different points of view.

It should be appreciated that the action family structures shown in FIGS. 7 and 8 are basic. In practice, action families may be considerably larger and more complex. Table XXVI below provides an example of a more complex action family for the act type "copy" in the exemplary rights data dictionary. This example illustrates the point that metadata relationships, even in relatively simple processes, may contain a large number of possible contextual relationships which may be relied upon in a particular scheme. A useful interoperable dictionary should be capable of mapping any one of those relationships. As these relationships can be logically generated from the underlying context model and other defined rules, the volume of relationships is not in itself a major constraint. Also, for greater efficiency, inclusion of terms in a suitable data dictionary should be on an "as needed" rather than a mandatory basis.

When it is desired to add new terms to the data dictionary—to add specialized meanings, for example—the new terms may be added as members of an action family, or in the alternative, of a context family. Certain advantages may accrue from choosing to specialize by act type to create a specialized action family, as opposed to by context type to create a context family. One advantage is to better fulfill requirements for further specialization and mapping of existing non-data-dictionary terms. In other words, if further related specializations are likely to be required, an action family is likely to be most efficient, because an act type results in the begetting of a complete set of specialized terms from which further specializations can result. Another consideration is whether a new axiom is present in the meaning of a family: a new axiom will commonly need to be disseminated through a range of new terms in an action family.

On the other hand, choosing begetting by context type allows for the contextualization of existing action family terms. Specific conditions may thus be imposed on members of an action family, without the necessity for identifying a full range of new family terms. For example, the contextualized verb "play_1" is identical to its parent "play" except that its "source of playing" is a "digital resource," i.e., a special condition is placed on the resource term. Other members of the family (such as "playedresource_1") can be likewise begotten if and when required for reasons of mapping or specialization. In an embodiment of the invention, the families of standardized terms are mostly based on act types, but it may be anticipated that as the dictionary grows to accommodate greater specialization, the majority of new families may be context families.

A context family may contain all the same term types as an action family, except that they are begotten from the context type and not the act type. In the exemplary rights data dictionary, each authorized context type which is the head of a context family may beget terms which are values of the term types set out in Table XXVII below. Similarities to the action family structure should be apparent from the example. Also, like action family relationships, context family begetting relationships have defined reciprocal relationships.

It may be desirable to define a context description as a group of relating terms that describe a context terms relationship to other basic term types. That is, defined context descriptions may allow for convenient identification of basic term types related to any desired context term. Table XXVIII sets forth relating terms for use in such context descriptions, according to the rights data dictionary. Table XXIX sets for a specific example of a context description for the term "originating event."

Figure 10:
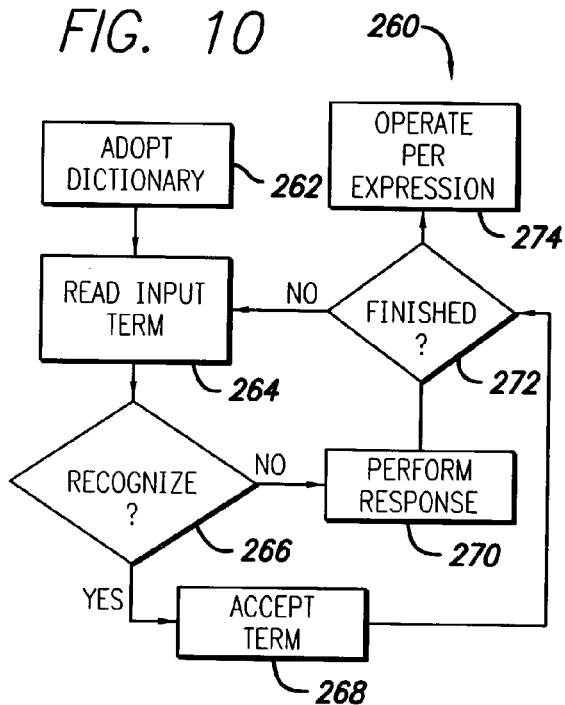
FIG. 10 is a diagram showing exemplary steps of a method for parsing a metadata expression using a data dictionary, such as for a digital rights management application.

A data dictionary—in particular, a rights data dictionary according to the invention—should be regarded as a tool to be used in the processing of metadata, as per FIG. 1. An exemplary method 260 for parsing a metadata expression using a rights data dictionary according to the invention is shown in FIG. 10. Parsing may occur in applications such as for digital rights management. Any suitable method for parsing an expression may be used, as known in the art, with adoption of a rights data dictionary according to the invention at step 262. The adopting step 262 generally (but not necessarily) will occur well in advance of the remaining steps of method 260. In the context of method 260, step 262 refers, among other things, to programming a computer to operate in some way using an expression defined in accordance with a data dictionary according to the invention. In other words, definitions and rules set forth in a data dictionary according to the invention are used in some way that affects output of the computing operation. Similarly, a data dictionary according to the invention may be adopted by formulating a rights expression using the data dictionary. Other tools may be used, such as a rights expression language, but semantic content is as defined or mapped by the dictionary. One of ordinary skill will know how to perform these and other ways of adopting a data disclosure according to the invention, based on the disclosure herein.

At step 264, a term of an expression formulated according to the adopting step 262 is read using any suitable computer process, as known in the art. At step 266, the term is compared with known terms to determine if it is recognized. If it is recognized, it is accepted at step 268 as a valid term. The status of the reading operation is checked at step 272, and if there is an additional term to be read, the process loops back to step 264. If the read term is not recognized at step 266, any desired response may be performed at step 272 before proceeding to step 272, or the process may terminate. In general, any suitable method for reading an expression may be used as known in the art, and the precise enumerated steps 264–272 should be regarded as merely exemplary.

After the expression is read as determined at step 272, an operation is performed on the expression at step 274, based on the content of the expression. The operation is performed at least in part according to information adopted from a data dictionary according to the invention, such as at step 262. Hence, FIG. 10 illustrates an exemplary way that one of ordinary skill may make use of the invention in the context of a commonplace parsing operation for an application such as digital rights management.

Figure 11:
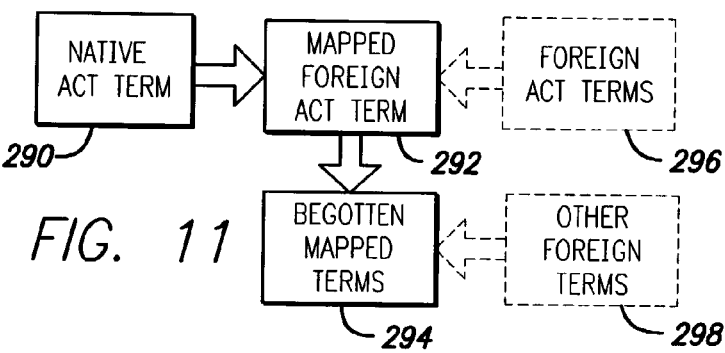
FIG. 11 is a diagram showing an exemplary aspect of mapping using a data dictionary according to the invention.

A rights data dictionary may also be applied for the purpose of providing interoperability between different expression languages. Indeed, it should be appreciated that a desire to provide for such interoperability in the context of rights expression languages provided an important motivation for development of the invention. In the rights data dictionary, a schema is provided to for breaking down semantic content into a orderly hierarchy that supports mapping between terms from different expression languages. FIG. 11 illustrates the concept that mapped terms may be begotten from a mapped act term 292 by application of the context model. The context model may be used to beget mapped terms within the data dictionary. All of the data dictionary's tools for creating, organizing, and describing semantic context may thereby be made use of for mapping.

These benefits come from a recognition that it should be possible, for virtually any foreign (arbitrary external) term, to relate the term to an event, and hence, to a foreign act term 296. If it does not exist, the foreign act term 296 may be hypothesized for the purpose of applying the context model. Once a foreign act term has been identified (or hypothesized), it should be possible to beget a corresponding mapped foreign act term 292, that has a defined semantic relationship (typically, but not necessarily, an identical meaning) to a native act term 290. Other mapped terms may then be begotten from the mapped foreign act term 292 by application of the context model described herein.

As described herein, defined relationships, each of which may be expressed using a relating term, result from a begetting or deriving process. These relationships may be used to define the meaning of the begotten or derived mapped terms 294. In many situations, defined semantic relationships will be easily identified between ones of the begotten/derived mapped term 294 and ones of other foreign terms 298. The begotten or derived mapped terms, at least to the extent having the same meaning as the foreign terms, may then be adopted as a mapped term of the data dictionary. The mapped terms 292, 294 may also be assigned a suitable identifier, or other attribute, so that the foreign terms 296, 298 may be automatically interpreted in a way consistent with their mapping relationships, such as during an interpretation or translating operation. Such translations may frequently be needed for interoperability between different rights expression languages in the context of rights management. It should be apparent that similar dictionaries may facilitate mapping for applications other than rights management, as well, and in particular, between event-based expression languages in general.

Figure 12:
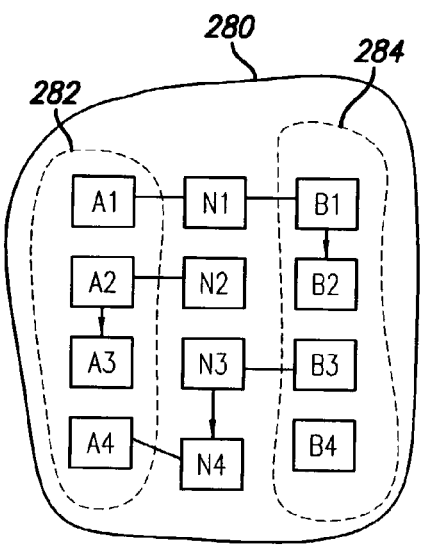
FIG. 12 is a diagram showing exemplary mapping relationships within a data dictionary.

FIG. 12 shows exemplary mapping relationships within a data dictionary such as may result from mapping as described above. Dictionary 280 comprises term sets 282 and 284, and a set of native terms N1–N4 belonging to the data dictionary, but not to either term set 282, 284. Term set 282 comprises mapped terms A1–A4, which correlate to terms in a first foreign expression language. Terms set 284 comprises mapped terms B1–B4, which correlate to terms in a second foreign expression language. Dictionary 280 may contain any plural number of such terms and term sets. Lines are drawn between terms to represent a relationship of equivalent meaning, such as may be expressed, for example, by "term A1 means the same as term N1." Arrow represent a begetting relationship within a term set. Hence, dictionary 280 includes suitable relationships for performing one-to-many translations between term sets. For example, a mapped term A1 is first related to native term N1, and then to mapped term B1, to translate from the first expression language into the second.

Advantageously, a single set of mapping relationships is needed each time a new term set, corresponding to a different expression language, is added. This single set is the mapping relationship to the native term set of the data dictionary, e.g., terms N1–N4 of dictionary 280. There should be little or no need to define relationships directly between different mapped term sets, at least for translation purposes.

Various other types of mapped relationships may occur within the dictionary 280. For example, some mapped terms, such as A2, may be mapped to a native term but not a term in another term set. Other terms, such as A3 and B2, may be related to mapped terms within their own term set by a begetting-type relationship, but not directly mapped to a native term. Still other terms, such as B4, may be used only within a foreign expression language, and as such, may be isolated. Accordingly, terms A2, A3, B2, and B4 do not have sufficient relationships for translating between the term sets 282, 284. In contrast, it should be possible to translate between terms A4 and B3, because they are connected by a semantic chain that includes a relationship between native terms N3 and N4. Assuming that this relationship between N3 and N4 can be expressed in both foreign expression languages associated with term sets 282 and 284, an accurate translation between A4 and B3 merely assumes its semantic content. This example illustrates one use for genealogies as defined above.

Figure 13:
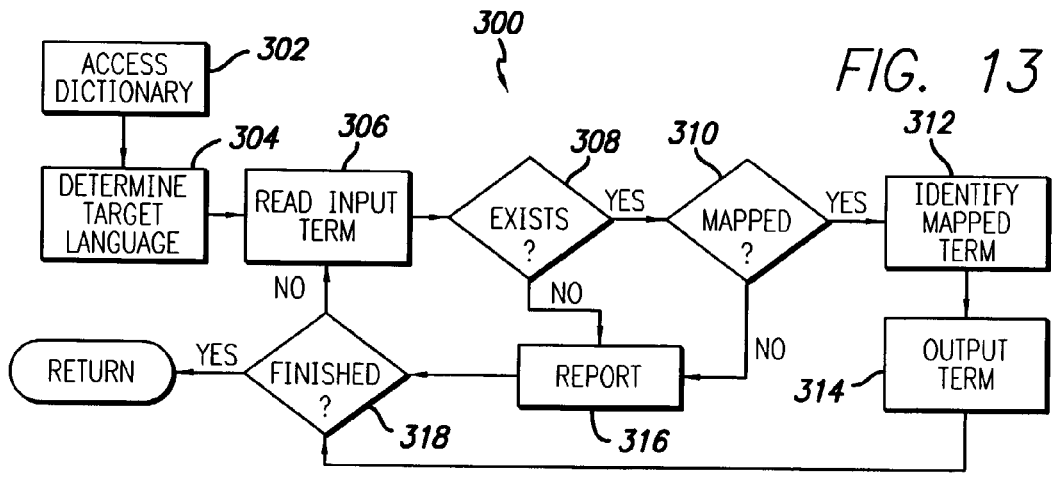
FIG. 13 is a diagram showing exemplary steps for translating a term using a data dictionary.

One of ordinary skill should be able to apply the foregoing mapping concepts in connection with a rights data dictionary to translate between different rights expression languages. FIG. 13 shows exemplary steps of a method 300 by which such a translation may be accomplished for an particular expression. At step 302, a rights data dictionary according to the invention is accessed, such as using any suitable database process as known in the art. At step 304, the desired target (output) expression language is identified, such as by receiving input from a user, or by automatically determining a required output. At step 306, a term of the expression is read. At step 308, the data dictionary is consulted to determine whether the read term is recognized by the data dictionary. If so, at step 310, the data dictionary is consulted to determine whether a map (defined semantic chain) exists from the term to another term associated with the targeted expression language. If so, at step 312, the mapped term and any intervening semantic material in the defined semantic chain is output at step 314. The process continues until the expression has been translated as determined at step 318.

In the event of a non-recognition event at either of steps 308 and 310, some sort of suitable report or other action may be taken at step 316. One of ordinary skill should be able to use known computing methods and systems to carry out a translation using a data dictionary according to the invention as set forth in method 300, and in other suitable ways. One of ordinary skill should also be able to apply the invention to translate between machine expression languages for applications other than rights expression and rights management.

In addition, as a check on the accuracy of a particular translation, it may be desirable to perform a translation operation in reverse, to translate the translated expression back into the original expression. If the reverse-translated expression is not identical to the original expression, this may indicate some defect in the mapping relationships. In such case, the translated expression may be flagged or some other suitable action may be taken, as at step 316.

It may be helpful to review a particular example of mapped relationships for a foreign term set. One such example is provided by Table XXX below, which describes a mapping of a particular set of rights expression language terms by application of the context model. This particular example makes use of arbitrary value types for many terms. Other mappings may not.

Tables

The tables below are adapted from the document entitled Text of ISO/IEC CD 21000-Part 6—Rights Data Dictionary (RDD), dated Jul. 27, 2002, which is incorporated herein by reference. The copyright holder has no objection to the reproduction of copyrighted material from this document exactly as it may appear in an official publication of this application or in a patent that issues therefrom, but otherwise reserves all rights whatsoever.

TABLE I

Term Status

| Allowed Value of Term Status Definition | Constraints |
|---|---|
| Standardized Term<br>A term explicitly defined by a governing standard. | The creation, modification or deletion of a standardized term requires an amendment or a corrigendum to the standard. |
| Native Term<br>A term other than a standardized term that has an authorized headword and a definition. | A term has an authorized headword and definition when it is begotten from another native term, or inherits meaning from another native term or standardized term without reliance upon non-standard qualifications.<br>Native terms may be established by a registration authority rather than explicitly by a standard, but otherwise have the same properties as standardized terms.<br>A term may be given an authorized headword and definition when it has headwords registered by two or more authorities.<br>This provision enables two or more equivalent terms from different authorities other than that responsible for standardization to be mapped to a common authorized term. |
| Adopted Term<br>A term with a headword and definition under an authority other than the standard authority, upon which the standard authority has chosen to rely. | The standard authority may cede the governance of the definition and headword of a term and its types to another authority provided that;<br>(a) the authority is recognized by the standard registration authority as having established authority for a specific term set of interest under its criteria for adding terms;<br>(b) the term or term set can be mapped consistently to native terms; and<br>(c) the term or term set has an established method of maintenance. |
| Mapped Term<br>A term under an authority other than the standard authority, which has an identifier attribute and at least one relationship with another term (other than an isolated term). | (d) A mapped term has a genealogy but does not meet the criteria for adopted, native or standardized terms.<br>(e) comment (informative): mapped terms originate from authorities other than the standard authority, and typically occur under just one authority. A term under two or more non-standard authorities normally becomes a native term, but this is not mandatory, to allow for the mapping of highly localized, proprietary or restricted terms to one another. |

TABLE I-continued

Term Status

| Allowed Value of Term Status Definition | Constraints |
|---|---|
| Isolated Term<br>A term under an authority other than the standard authority, which has an identifier but no relationship with another term (other than another isolated term). | A term is isolated when it has been registered by another authority and<br>(a) mapping is not, or not yet, possible; or<br>(b) mapping is not required by the authority, but the authority wishes to add the term to its term set within the rights data dictionary. |

TABLE II

Meaning Types

| Headword<br>Definition | Comments (informative) |
|---|---|
| Original Meaning<br>A meaning entirely comprised of semantic material introduced from outside of the dictionary. | The first term ("act") is the only authorized term with an original meaning. |
| Partly Derived Meaning<br>A meaning comprised of original semantic material, combined with one or more existing meanings derived from related terms. | Meaning is derived through inheritance and other relationships which are established, directly or indirectly, on the basis of the context model. The relating terms, which establish inheritance, described in relation to genealogy, and elsewhere in the specification. |
| Derived Meaning<br>A meaning wholly comprised from a combination of two or more existing meanings derived from related terms. | |

TABLE III

Audit Attributes

| Headword<br>Contextual description | Constraints |
|---|---|
| Date<br>The date of the event. | Each event shall have one date. |
| Act Type<br>The type of act in the event. | Each event shall have one act type. The allowed values of the audit attribute act type are CREATE, MODIFY and DELETE. Further values may be added if required by the registration authority. |
| Authority<br>The authority responsible for the act. | Each event is under at least one authority. |
| Audit Reason<br>The reason for the event. | Each event may have at least one audit reason. The allowed values of audit reason shall be established by the registration authority. |
| Audit Comment<br>A comment on the reason for, or circumstances surrounding, the event. | Each event may have any number of comments in any language. Audit comments may be used as an alternative or as complementary to an audit reason. |

TABLE IV

Comments

| Property of Comment | Constraints |
|---|---|
| Occurrence | Each term or commentable term attribute may have any number of comments under any number of authorities in any number of languages. One comment may be attributed to any number of terms. |
| Authority | Each comment shall have at least one authority. |
| Language | The language of each comment shall be identified. The value of language for a comment shall not be null. Comments on all terms other than isolated terms shall at least be expressed in a specified common description language. |

TABLE V

Term Descriptions

| Property of Term Description | Constraints |
|---|---|
| Occurrence | Each term may have any number of term descriptions under any number of authorities in any number of languages. |
| Authority | Each term description shall have at least one authority. Wherever a term description exists under a non-standard authority, it should be included in the dictionary if possible. |
| Language | The language of each term description shall be identified. The value of language for a term description shall not be null. Term descriptions of all terms other than isolated terms shall at least be expressed in the common description language. |
| Comments | A term description may have any number of comments under any number of authorities in any number of languages. |
| Types | Each term description shall have exactly one term description type. |

TABLE VI

Languages

| Property of Language | Constraints |
|---|---|
| Allowed Values | The language of a textual element shall be identified using ISO639 L\language codes. |

TABLE VI-continued

Languages

| Property of Language | Constraints |
| --- | --- |
| Common Description Language | The value of the common description language shall be English (ISO 639-2 code: eng). |
| Translations | Where a textual element is a translation of another textual element into another natural language, this shall be described by a relationship using the relating term ISTRANSLATIONOF. |
| Selection | The language attributed to a textual element shall be the language in which the element is intended to be read and understood, and not the language according to the linguistic origin of the term. Example: Where a term of Latin origin (such as per cent) or French origin (such as avant garde) is being used in the context of a textual element expressed otherwise in English, it shall be identified as a textual element in the English Language. |

TABLE VII

Term Description Types

| Headword of Term Description Type | Constraints |
| --- | --- |
| Definition A term description according to formal rules. | A term may have any number of definitions under any number of authorities. Comment: The wording of two definitions may vary but they may be considered to be identical in meaning. This is tautologically true for translated definitions, but can also apply to definitions in the same language under two different authorities. Each authority may establish its own formal rules for definitions. RDD recognizes two types of definition: Rdd definition and adopted definition. A definition may have any number of comments under the standard RDD authority in any language. |
| Rdd Definition The definition of an Rdd authorized term. | A standardized term or native term shall have exactly one rdd definition in the common descriptive language, and may have translations of this in any number of languages. The authority for an rdd definition is the rdd authority. |
| Adopted Definition the definition of a term, adopted by the rdd standard authority from another authority. | An adopted term shall have one adopted definition in the common description language, and may have translations of this in any number of languages. The authorities for an adopted definition are the Rdd standard authority and the authority from whom the adopted definition is obtained. |
| Example An instance of usage illustrating the meaning of a term. | Each term may have any number of examples under any number of authorities in any language. |

TABLE VIII

Headwords

| Property of Headword | Constraints |
| --- | --- |
| Occurrence | A term may have headwords under any number of authorities in any number of languages, and shall have at most one headword in any one language under any one authority. |
| Authority | Each headword shall have at least one authority. A term may have different headwords (and synonyms) under different authorities. Conversely, the same headword (or synonym) may be used by different authorities to refer to different terms. |
| Language | The language of each headword shall be identified. The value of language for a headword may be null. Headwords are commonly expressed as words or phrases from a recognizable natural language. However, headwords may also take the form of numbers or codes and so may have a null language value. |
| Uniqueness | The combination of headword or synonym, language and authority shall be unique. |
| Comments | A headword may have any number of comments under any number of authorities in any number of languages. |
| Synonym | A headword may have any number of synonyms under the same authority(ies) as the headword. |

TABLE IX

Synonyms

| Property of Synonym | Constraints |
| --- | --- |
| Scope | A synonym may be a natural language name or any kind of identifier. alternative language versions or translations of a headword are synonyms. |
| Authority | Each synonym has at least one authority, which is identical to the authority(ies) of the headword to which it is related. |
| Language | The language of each synonym is identified. The value of language for a synonym may be null. Like headwords, synonyms are commonly expressed as words from a recognizable natural language. however, synonyms may also take the form of numbers or codes and so may have a null language value. |
| Uniqueness | The combination of headword or synonym, language and authority shall be unique. |
| Comments | A synonym may have any number of comments under any number of authorities in any number of languages. |

TABLE X

Relationship Syntax

Enumerator Term1 [Value1] → RelatingTerm → Term2 [Value2] [occ:n] [true:Value] [prec:Value] [StartTime:Value] [EndTime:Value] [auth:Value]

Examples of Triples:
Examples of conventional presentation of relationships in this standard:

1  DOING → ISTYPEOF → ACTING
2  DERIVINGEVENT [#1] → HASAGENTTYPE → DERIVER [#2]
3  foo:Writer → ISEQUALTO → Translator [true:NEVER]

TABLE X-continued

Relationship Syntax

Enumerator Term1 [Value1] → RelatingTerm → Term2 [Value2] [occ:n] [true:Value] [prec:Value] [StartTime:Value] [EndTime:Value] [auth:Value]

Examples of Triples:
Examples of conventional presentation of relationships in this standard:

4  foo:Writer → ISEQUALTO → Author [prec:APPROXIMATELY] [auth:foo]
5  Euro → ISCurrencyOf → France [StartTime:20010101]

TABLE XI

Relationship Attributes

| Attribute | Description | Occurs |
|---|---|---|
| Enumerator | Each relationship within RDD has a unique internal identifier. | 1 |
| Term1 | The term or relationship that is the subject of the relationship. | 1 |
| [Value1] | A value ascribed to Term1. Values may be other terms, strings, integers or arbitrary values. Where a value is not ascribed, Term1 shall be presumed to represent all possible values of its type. | 0–1 |
| Relating Term | The term that describes the nature of the association between Term1 and Term2 within the relationship. | 1 |
| Term2 | The term or relationship that is the object of the relationship. | 1 |
| [Value2] | A value ascribed to Term2. Values may be other terms, strings, integers or arbitrary values. Where a value is not ascribed, Term2 shall be presumed to represent all possible values of its type. | 0–1 |
| [occ:n] | Valid only when a relationship is included within a context description. The number ("n") of possible occurrences of this relationship type in an instance of a context description. | 0–1 |
| [true:Value] | The value of the QUALITYTYPE RELIABILITY applied to the relating term, expressing the frequency with which the relationship is true. Allowed values are ALWAYS, USUALLY, SOMETIMES and NEVER. The default value is ALWAYS. Comment (Informative): The values ALWAYS, SOMETIMES and NEVER correspond to the commonly employed values MUST, MAY and MAYNOT. The value USUALLY also corresponds to MAY: the distinction between USUALLY and SOMETIMES is made to allow preference to be expressed in ambiguous mappings: for example, foo:Writer is USUALLY EqualTo Author and SOMETIMES EqualTo Translator. | 0–1 |
| [prec:Value] | The value of the QUALITYTYPE PRECISION applied to the RelatingTerm, expressing the accuracy of the relationship. Allowed values are EXACT and APPROXIMATE. The default value is EXACT. | 0–1 |
| [StartTime:Value] | The time from which the relationship is valid. | 0–1 |
| [EndTime:Value] | The time until which the relationship is valid. | 0–1 |
| [auth:Value] | An authority authorizing the relationship. In any one relationship, all attributes must be authorized by the same authorities. | 1–n |

TABLE XII

Genealogy

| Relating Term | Occurs | Examples (Informative) |
|---|---|---|
| Group A | | |
| ISCONTEXTTYPEBEGOTTENBY | 0–1 | COPYINGEVENT → ISCONTEXTTYPEBEGOTTENBY → COPY |
| ISAGENTTYPEBEGOTTENBY | 0–1 | ADAPTOR → ISAGENTTYPEBEGOTTENBY → ADAPT |
| ISRESOURCETYPEBEGOTTENBY | 0–1 | IDENTIFIER → ISRESOURCETYPEBEGOTTENBY → IDENTIFIER |
| ISTIMETYPEBEGOTTENBY | 0–1 | TIMEOFMODIFYING → ISTIMETYPEBEGOTTENBY → MODIFY |
| ISPLACETYPEBEGOTTENBY | 0–1 | PLACEOFASSERTING → ISPLACETYPEBEGOTTENBY → ASSERT |

TABLE XII-continued

Genealogy

| Relating Term | Occurs | Examples (Informative) |
|---|---|---|
| ISSTATETYPEBEGOTTENBY | 0–1 | SITUATION → ISSTATETYPEBEGOTTENBY → EVENT |
| ISSTATUSTYPEBEGOTTENBY | 0–1 | EXECUTABLE → ISSTATUSTYPEBEGOTTENBY → EXECUTE |
| ISENTITYTYPEBEGOTTENBY | 0–1 | EXISTER → ISENTITYTYPEBEGOTTENBY → EXISTENCE |
| ISATTRIBUTETYPEBEGOTTENBY | 0–1 | (No examples in StandardizedTerms) |
| Group B | | |
| ISTYPEOF | 0–1 | n Copy → ISTYPEOF → DERIVE |
| | | n PRIMARYNAME → ISTYPEOF → NAME |
| HASCOMPONENT | 0, 2–n | n CREATOR → HASCOMPONENT → ORIGINATOR [true:SOMETIMES] |
| | | n CREATOR → HASCOMPONENT → DERIVER [true:SOMETIMES] |
| ISEQUALTO | 0–n | n foo:arranger → ISEQUALTO → DERIVER [prec:APPROXIMATE] |
| ISPARTOF | 0–n | n foo:fragment → ISPARTOF → foo:resource |
| ISALLOWEDVALUEOF | 0–n | n EXACT → ISALLOWEDVALUEOF → PRECISION |
| ISCLASSOF | 0–n | n TERMSTATUS → ISCLASSOF → TERM |
| ISOPPOSEDTO | 0–n | n ASSERT → ISOPPOSEDTO → DENY |

TABLE XIII

Genealogy of Relating Term

| RelatingTerm | Occurs | Examples (Informative) |
|---|---|---|
| ISRELATINGTERMFROM | 1 | ISPERFORMEDBY → ISRELATINGTERMFROM → PERFORMANCE |
| ISRELATINGTERMTO | 1 | ISPERFORMEDBY → ISRELATINGTERMTO → PERFORMER |
| ISRECIPROCALOF | 1 | ISPERFORMEDBY → ISRECIPROCALOF → ISPERFORMEROF |

TABLE XIV

Genealogy Structure: Examples

Example: Genealogy for COPYINGEVENT

1 COPYINGEVENT → ISTYPEOF → DERIVINGEVENT
2 COPYINGEVENT → ISCONTEXTTYPEBEGOTTENBY → COPY

Example: Genealogy for PATIENT

1 PATIENT → ISTYPEOF → Resource
2 PATIENT → ISRESOURCETYPEBEGOTTENBY → DO

Example: Genealogy for TERMSET

1 TERMSET → ISTYPEOF → SET
2 TERMSET → HASMEMBER → TERM [OCC:1–N]
3 TERMSET → HAS → AUTHORITY [OCC:1–N]

Example: Genealogy for SOURCEFORPRINTING

1 SOURCEFORPRINTING → ISTYPEOF → SOURCEOFTRANSFORMATION
2 SOURCEFORPRINTING → ISTYPEOF → SOURCEOFFIXATION
3 SOURCEFORPRINTING → ISRESOURCETYPEBEGOTTENBY → PRINT
4 SOURCEFORPRINTING → ISA → FIXATION

TABLE XV

Basic Term Set

| Headword Definition | Comments (Informative) |
|---|---|
| Context<br>The circumstances in which acting occurs. | A context is defined by the sum of its attributes. The principal types of context are the EVENT (in which some attribute changes) and the SITUATION (in which no attributes change). |
| Agent<br>An entity that acts. | Typically, agents are people or corporate bodies, but they may also be inanimate things such as computers or computer applications, which are activated directly or indirectly by people to have agency in particular contexts. Events may also be agents (for example, one event may be the CAUSE of another). |
| Resource<br>An entity involved in a context, other than as an agent, time or place. | Resource is the "catch-all" for anything affected in some way by an act which is not an agent, time or place. Resources are commonly inanimate things, but may be people or corporate bodies other than the agent; or other contexts which are affected by the act (for example, a SITUATION which is the RESULT of an EVENT); or times and places when they are involved (for example) as the subject of a CREATION. |
| Time<br>The temporal parameters of a context. | Contexts may have multiple times expressed as discrete values or ranges with any required attributes including precision and continuity. |
| Place<br>The spatial parameters of a context. | Contexts may have multiple places expressed as discrete values or ranges with any required attributes including precision and continuity. |

TABLE XVI

Basic Term Types

| Headword RddDefinition | Examples (Informative) |
|---|---|
| Context Type<br>A type of context. | DERIVINGEVENT is the context type of the act type DERIVE.<br>ASSERTION is the context type of the act type ASSERT<br>SITUATION is the context type of the act type HAVE |
| Agent Type<br>A type of agent. | DERIVER is the agent type of the act type DERIVE.<br>ASSERTER is the agent type of the act type ASSERT.<br>ENTITY is the agent type of the act type HAVE. |
| Resource Type<br>A type of resource | DERIVATION, SOURCEOFDERIVATION and DERIVINGTOOL are resource types of the act type DERIVE.<br>ASSERTEDRESOURCE is a resource type of the act type ASSERT.<br>ATTRIBUTE is a resource type of the act type HAVE. |
| Time Type<br>A type of time. | TIMEOFDERIVING is the time type of the act type DERIVE.<br>TIMEOFASSERTING is the time type of the act type ASSERT.<br>TIMEOFSITUATION is the time type of the act type HAVE |
| Place Type<br>A type of place. | PLACEOFDERIVING, PLACEOFDERIVINGFROM AND PLACEOFDERIVINGTO a place type of the act type DERIVE.<br>PLACEOFASSERTING is the place type of the act type ASSERT.<br>PLACEOFSITUATION is the place type of the act type HAVE. |

TABLE XVII

Basic Relating Terms

| Headword Definition | Comments |
|---|---|
| Has Agent Type<br>A relating term that links a context to an agent type which acts in it. | For example, linking a CREATOR to a CREATINGEVENT. See reference numeral 216 in FIG. 8. |
| Has Resource Type<br>A relating term that links a context to a resource type that is involved in it. | For example, linking a CREATION to a CREATINGEVENT. See reference numeral 220 in FIG. 8. |
| Has Time Type<br>A relating term that links a context to a time type in relation to which it happens. | For example, linking a TIMEOFCREATING to a CREATINGEVENT.<br>See reference numeral 218 in FIG. 8. |
| Has Place Type<br>A relating term that links a context to a place type in relation to which it happens. | For example, linking a PLACEOFCREATING to a CREATINGEVENT. See reference numeral 222 in FIG. 8. |
| Has Value<br>A relating term that links a term to a value of it. | This relating term is drawn from the action family for the act type EVALUATE.<br>See reference numerals 224, 226 in FIG. 8. |

TABLE XVIII

Example of Action Family
Context Model Term Type Relationships in the COPY Action Family:

1 COPY → BEGETSCONTEXTTYPE → COPYINGEVENT
2 COPY → BEGETSAGENTTYPE → COPIER
3 COPY → BEGETSRESOURCETYPE → SOURCEOFREPLICA
4 COPY → BEGETSRESOURCETYPE → REPLICA
5 COPY → BEGETSRESOURCETYPE → COPYINGTOOL
6 COPY → BEGETSTIMETYPE → TIMEOFCOPYING
7 COPY → BEGETSPLACETYPE → PLACEOFCOPYING
8 COPY → BEGETSPLACETYPE → PLACEOFCOPYINGFROM
9 COPY → BEGETSPLACETYPE → PLACEOFCOPYINGTO

TABLE XIX

Action Family Status Types

| Status Definition | Examples (informative) |
|---|---|
| Historic Status<br>Of an entity which has been an agent type or resource type in a context. | Typically based on a past participle: for example, something that has been IDENTIFIED, USED, COPIED, PLAYED, CATEGORIZED, ADAPTED, OWNED. This status is not specific about the context in which this happened. |
| Current Status<br>Of an entity which is an agent type or resource type in a context. | Typically based on a present participle: for example, something that is TRANSFORMING, PRINTING, WRITING, BEINGMODIFIED, USINGTOOL. This status is not specific about the context in which this is taking place. |
| Potential Status<br>Of an entity which may be an agent type or resource type in a context in future. | For example, something that is PERCEIVABLE, ADAPTABLE, USABLE, COPIABLE, EXECUTABLE. This status is not specific about the context in which this may take place. |

TABLE XX

Status Terms

| Status Definition | Examples |
|---|---|
| Historic Status Of an entity which has been an agent type or resource type in a context. | Typically based on a past participle: for example, something that has been IDENTIFIED, USED, COPIED, PLAYED, CATEGORIZED, ADAPTED, OWNED. This Status is not specific about the Context in which this happened. |
| Current Status Of an entity which is an agent type or resource type in a context. | Typically based on a present participle: for example, something that is TRANSFORMING, PRINTING, WRITING, BEINGMODIFIED, USINGTOOL. This Status is not specific about the context in which this is taking place. |
| Potential Status Of an entity which may be an agent type or resource type in a context in future. | For example, something that is PERCEIVABLE, ADAPTABLE, USABLE, COPIABLE, EXECUTABLE. This status is not specific about the context in which this may take place. |

TABLE XXI

Status Types Begotten From "Act"

| | Agent Type | Resource Type |
|---|---|---|
| Historic | Acted | Acted On |
| Current | Acting | Being Acted On |
| Potential | Active | Actionable |

TABLE XXII

Examples of Status Type Relationships
STATUSTYPE Relationships in the COPY Action Family:

1 COPY → BEGETSSTATUSTYPE → COPIABLE
2 COPY → BEGETSSTATUSTYPE → COPYING
3 COPY → BEGETSSTATUSTYPE → COPIED
4 COPY → BEGETSSTATUSTYPE → BEINGCOPIED
5 COPY → BEGETSSTATUSTYPE → COPIEDFROM
6 COPY → BEGETSSTATUSTYPE → BEINGCOPIEDFROM
7 COPY → BEGETSSTATUSTYPE → COPIABLEFROM

TABLE XXIII

AFRV Relating Terms for "Act"

| | Agent | Resource | Time | Place |
|---|---|---|---|---|
| Agent | has co-agent | is agent acting on | is agent at time | is agent in place |
| Resource | is resource acted on by | has co-resource | is resource at time | is resource in place |
| Time | is time of acting by | is time of being acted on of | has co-time | is time of acting in place |
| Place | is place of acting by | is place of being acted on of | is place of acting at time | has co-place of acting |

TABLE XXIV

Exemplary AFRV Relating Terms from An Action Family
AFRV RELATING TERM RELATIONSHIPS IN THE COPY ACTION FAMILY:

1 COPY → BEGETSRELATINGTERM → HASCO-COPIER
2 COPY → BEGETSRELATINGTERM → ISCOPIERFROM
3 COPY → BEGETSRELATINGTERM → ISCOPIEROF
4 COPY → BEGETSRELATINGTERM → ISCOPIERWITHTOOL
5 COPY → BEGETSRELATINGTERM → ISCOPIERATTIME
6 COPY → BEGETSRELATINGTERM → ISCOPIERINPLACE
7 COPY → BEGETSRELATINGTERM → ISCOPIERFROMPLACE
8 COPY → BEGETSRELATINGTERM → ISCOPIERTOPLACE
9 COPY → BEGETSRELATINGTERM → ISSOURCEOFREPLICAOFCOPYINGBY
10 COPY → BEGETSRELATINGTERM → HASCO-SOURCEOFREPLICA
11 COPY → BEGETSRELATINGTERM → ISSOURCEOFREPLICAOF
12 COPY → BEGETSRELATINGTERM → ISCOPIEDFROMWITHTOOL
13 COPY → BEGETSRELATINGTERM → ISSOURCEOFREPLICAATTIME

TABLE XXIV-continued

Exemplary AFRV Relating Terms from An Action Family
AFRV RELATING TERM RELATIONSHIPS IN THE COPY ACTION FAMILY:

14 COPY → BEGETSRELATINGTERM → ISCOPIEDFROMPLACE
15 COPY → BEGETSRELATINGTERM → ISREPLICAINPLACEOFCOPYINGTO
16 COPY → BEGETSRELATINGTERM → ISSOURCEOFREPLICAINPLACE
17 COPY → BEGETSRELATINGTERM → ISSOURCEINPLACEOFCOPYINGFROM
18 COPY → BEGETSRELATINGTERM → ISSOURCECOPIEDFROMTOPLACE
19 COPY → BEGETSRELATINGTERM → HASCO-REPLICA
20 COPY → BEGETSRELATINGTERM → ISCOPIEDWITHTOOL
21 COPY → BEGETSRELATINGTERM → ISCOPIEDATTIME
22 COPY → BEGETSRELATINGTERM → ISCOPIEDINPLACE
23 COPY → BEGETSRELATINGTERM → ISCOPIEDFROMPLACE
24 COPY → BEGETSRELATINGTERM → ISREPLICAINPLACEOFCOPYINGTO
25 COPY → BEGETSRELATINGTERM → ISCOPYINGTOOLOF
26 COPY → BEGETSRELATINGTERM → ISTOOLFORCOPYINGFROM
27 COPY → BEGETSRELATINGTERM → ISTOOLFORCOPYING
28 COPY → BEGETSRELATINGTERM → HASCO-TOOLFORCOPYING
29 COPY → BEGETSRELATINGTERM → ISTOOLFORCOPYINGATTIME
30 COPY → BEGETSRELATINGTERM → ISTOOLFORCOPYINGINPLACE
31 COPY → BEGETSRELATINGTERM → ISTOOLFORCOPYINGFROMPLACE
32 COPY → BEGETSRELATINGTERM → ISTOOLFORCOPYINGTOPLACE
33 COPY → BEGETSRELATINGTERM → ISTIMEOFCOPYINGBY
34 COPY → BEGETSRELATINGTERM → ISTIMEOFCOPYINGFROM
35 COPY → BEGETSRELATINGTERM → ISTIMEOFCOPYINGOF
36 COPY → BEGETSRELATINGTERM → ISTIMEOFCOPYINGWITHTOOL
37 COPY → BEGETSRELATINGTERM → HASCO-TIMEOFCOPYING
38 COPY → BEGETSRELATINGTERM → ISTIMEOFCOPYINGINPLACE
39 COPY → BEGETSRELATINGTERM → ISTIMEOFCOPYINGFROMPLACE
40 COPY → BEGETSRELATINGTERM → ISTIMEOFCOPYINGTOPLACE
41 COPY → BEGETSRELATINGTERM → ISPLACEOFCOPYINGBY
42 COPY → BEGETSRELATINGTERM → ISPLACEOFCOPYINGFROM
43 COPY → BEGETSRELATINGTERM → ISPLACEOFCOPYINGOF
44 COPY → BEGETSRELATINGTERM → ISPLACEOFCOPYINGWITHTOOL
45 COPY → BEGETSRELATINGTERM → HASCO-PLACEOFCOPYING
46 COPY → BEGETSRELATINGTERM → ISPLACEOFCOPYINGATTIME
47 COPY → BEGETSRELATINGTERM → ISPLACEOFCOPYINGINCLUDINGPLACEOFCOPYINGFROM
48 COPY → BEGETSRELATINGTERM → ISPLACEOFCOPYINGINCLUDINGPLACEOFCOPYINGTO
49 COPY → BEGETSRELATINGTERM → ISPLACEOFCOPYINGFROMBY
50 COPY → BEGETSRELATINGTERM → ISPLACEOFCOPYINGFROMOF
51 COPY → BEGETSRELATINGTERM → ISPLACEOFCOPYINGFROMFROMSOURCE
52 COPY → BEGETSRELATINGTERM → ISPLACEOFCOPYINGFROMWITHTOOL
53 COPY → BEGETSRELATINGTERM → ISPLACEOFCOPYINGFROMATTIME
54 COPY → BEGETSRELATINGTERM → ISPLACEOFCOPYINGFROMWITHINPLACEOFCOPYING
55 COPY → BEGETSRELATINGTERM → HASCO-PLACEOFCOPYINGFROM
56 COPY → BEGETSRELATINGTERM → ISPLACEOFCOPYINGFROMTO
57 COPY → BEGETSRELATINGTERM → ISPLACEOFCOPYINGTOBY
58 COPY → BEGETSRELATINGTERM → ISPLACEOFCOPYINGTOOF
59 COPY → BEGETSRELATINGTERM → ISPLACEOFCOPYINGTOFROMSOURCE
60 COPY → BEGETSRELATINGTERM → ISPLACEOFCOPYINGTOWITHTOOL
61 COPY → BEGETSRELATINGTERM → ISPLACEOFCOPYINGTOATTIME
62 COPY → BEGETSRELATINGTERM → HASCO-PLACEOFCOPYINGTO
63 COPY → BEGETSRELATINGTERM → ISPLACEOFCOPYINGTOWITHINPLACEOFCOPYING
64 COPY → BEGETSRELATINGTERM → ISPLACEOFCOPYINGTOFROM

TABLE XXV

Reciprocal Relationships

| Relationship | Has Reciprocal | Occurs |
|---|---|---|
| ActType → BEGETSCONTEXTTYPE → ContextType | ContextType → ISCONTEXTTYPEBEGOTTENBY → ActType | 1 |
| ActType → BEGETSAGENTTYPE → AgentType | AgentType → ISAGENTTYPEBEGOTTENBY → ActType | 0–1 |
| ActType → BEGETSRESOURCETYPE → ResourceType | ResourceType → ISRESOURCETYPEBEGOTTENBY → ActType | 0–n |
| ActType → BEGETSTIMETYPE → TimeType | TimeType → ISTIMETYPEBEGOTTENBY → ActType | 1–n |
| ActType → BEGETSPLACETYPE → PlaceType | PlaceType → ISPLACETYPEBEGOTTENBY → ActType | 1–n |

TABLE XXV-continued

Reciprocal Relationships

| Relationship | Has Reciprocal | Occurs |
|---|---|---|
| ActType → BEGETSRELATINGTERM → AFRVRelatingTerm | AFRVRelatingTerm → ISRELATINGTERMBEGOTTENBY → ActType | 4–n |
| ActType → BEGETSSTATETYPE → StateType | StateType → ISSTATETYPEBEGOTTENBY → ActType | 0–n |
| ActType → BEGETSSTATUSTYPE → StatusType | StatusType → ISSTATUSTYPEBEGOTTENBY → ActType | 0–n |

TABLE XXVI

Exemplary Action Family
Example of a complete Action Family for COPY including all Relating Terms exemplified above:

```
 1 COPY → BEGETSCONTEXTTYPE → COPYINGEVENT
 2 COPY → BEGETSAGENTTYPE → COPIER
 3 COPY → BEGETSRESOURCETYPE → SOURCEOFREPLICA
 4 COPY → BEGETSRESOURCETYPE → REPLICA
 5 COPY → BEGETSRESOURCETYPE → COPYINGTOOL
 6 COPY → BEGETSTIMETYPE → TIMEOFCOPYING
 7 COPY → BEGETSPLACETYPE → PLACEOFCOPYING
 8 COPY → BEGETSPLACETYPE → PLACEOFCOPYINGFROM
 9 COPY → BEGETSPLACETYPE → PLACEOFCOPYINGTO
10 COPY → BEGETSRELATINGTERM → HASCO-COPIER
11 COPY → BEGETSRELATINGTERM → ISCOPIERFROM
12 COPY → BEGETSRELATINGTERM → ISCOPIEROF
13 COPY → BEGETSRELATINGTERM → ISCOPIERWITHTOOL
14 COPY → BEGETSRELATINGTERM → ISCOPIERATTIME
15 COPY → BEGETSRELATINGTERM → ISCOPIERINPLACE
16 COPY → BEGETSRELATINGTERM → ISCOPIERFROMPLACE
17 COPY → BEGETSRELATINGTERM → ISCOPIERTOPLACE
18 COPY → BEGETSRELATINGTERM → ISSOURCEOFREPLICAOFCOPYINGBY
19 COPY → BEGETSRELATINGTERM → HASCO-SOURCEOFREPLICA
20 COPY → BEGETSRELATINGTERM → ISSOURCEOFREPLICAOF
21 COPY → BEGETSRELATINGTERM → ISCOPIEDFROMWITHTOOL
22 COPY → BEGETSRELATINGTERM → ISSOURCEOFREPLICAATTIME
23 COPY → BEGETSRELATINGTERM → ISCOPIEDFROMPLACE
24 COPY → BEGETSRELATINGTERM → ISREPLICAINPLACEOFCOPYINGTO
25 COPY → BEGETSRELATINGTERM → ISSOURCEOFREPLICAINPLACE
26 COPY → BEGETSRELATINGTERM → ISSOURCEINPLACEOFCOPYINGFROM
27 COPY → BEGETSRELATINGTERM → ISSOURCECOPIEDFROMTOPLACE
28 COPY → BEGETSRELATINGTERM → HASCO-REPLICA
29 COPY → BEGETSRELATINGTERM → ISCOPIEDWITHTOOL
30 COPY → BEGETSRELATINGTERM → ISCOPIEDATTIME
31 COPY → BEGETSRELATINGTERM → ISCOPIEDINPLACE
32 COPY → BEGETSRELATINGTERM → ISCOPIEDFROMPLACE
33 COPY → BEGETSRELATINGTERM → ISREPLICAINPLACEOFCOPYINGTO
34 COPY → BEGETSRELATINGTERM → ISCOPYINGTOOLOF
35 COPY → BEGETSRELATINGTERM → ISTOOLFORCOPYINGFROM
36 COPY → BEGETSRELATINGTERM → ISTOOLFORCOPYING
37 COPY → BEGETSRELATINGTERM → HASCO-TOOLFORCOPYING
38 COPY → BEGETSRELATINGTERM → ISTOOLFORCOPYINGATTIME
39 COPY → BEGETSRELATINGTERM → ISTOOLFORCOPYINGINPLACE
40 COPY → BEGETSRELATINGTERM → ISTOOLFORCOPYINGFROMPLACE
41 COPY → BEGETSRELATINGTERM → ISTOOLFORCOPYINGTOPLACE
42 COPY → BEGETSRELATINGTERM → ISTIMEOFCOPYINGBY
43 COPY → BEGETSRELATINGTERM → ISTIMEOFCOPYINGFROM
44 COPY → BEGETSRELATINGTERM → ISTIMEOFCOPYINGOF
45 COPY → BEGETSRELATINGTERM → ISTIMEOFCOPYINGWITHTOOL
46 COPY → BEGETSRELATINGTERM → HASCO-TIMEOFCOPYING
47 COPY → BEGETSRELATINGTERM → ISTIMEOFCOPYINGINPLACE
48 COPY → BEGETSRELATINGTERM → ISTIMEOFCOPYINGFROMPLACE
49 COPY → BEGETSRELATINGTERM → ISTIMEOFCOPYINGTOPLACE
50 COPY → BEGETSRELATINGTERM → ISPLACEOFCOPYINGBY
51 COPY → BEGETSRELATINGTERM → ISPLACEOFCOPYINGFROM
52 COPY → BEGETSRELATINGTERM → ISPLACEOFCOPYINGOF
53 COPY → BEGETSRELATINGTERM → ISPLACEOFCOPYINGWITHTOOL
54 COPY → BEGETSRELATINGTERM → HASCO-PLACEOFCOPYING
55 COPY → BEGETSRELATINGTERM → ISPLACEOFCOPYINGATTIME
56 COPY → BEGETSRELATINGTERM → ISPLACEOFCOPYINGINCLUDINGPLACEOFCOPYINGFROM
57 COPY → BEGETSRELATINGTERM → ISPLACEOFCOPYINGINCLUDINGPLACEOFCOPYINGTO
58 COPY → BEGETSRELATINGTERM → ISPLACEOFCOPYINGFROMBY
```

TABLE XXVI-continued

Exemplary Action Family
Example of a complete Action Family for COPY including all Relating Terms exemplified above:

59 COPY → BEGETSRELATINGTERM → ISPLACEOFCOPYINGFROMOF
60 COPY → BEGETSRELATINGTERM → ISPLACEOFCOPYINGFROMFROMSOURCE
61 COPY → BEGETSRELATINGTERM → ISPLACEOFCOPYINGFROMWITHTOOL
62 COPY → BEGETSRELATINGTERM → ISPLACEOFCOPYINGFROMATTIME
63 COPY → BEGETSRELATINGTERM → ISPLACEOFCOPYINGFROMWITHINPLACEOFCOPYING
64 COPY → BEGETSRELATINGTERM → HASCO-PLACEOFCOPYINGFROM
65 COPY → BEGETSRELATINGTERM → ISPLACEOFCOPYINGFROMTO
66 COPY → BEGETSRELATINGTERM → ISPLACEOFCOPYINGTOBY
67 COPY → BEGETSRELATINGTERM → ISPLACEOFCOPYINGTOOF
68 COPY → BEGETSRELATINGTERM → ISPLACEOFCOPYINGTOFROMSOURCE
69 COPY → BEGETSRELATINGTERM → ISPLACEOFCOPYINGTOWITHTOOL
70 COPY → BEGETSRELATINGTERM → ISPLACEOFCOPYINGTOATTIME
71 COPY → BEGETSRELATINGTERM → HASCO-PLACEOFCOPYINGTO
72 COPY → BEGETSRELATINGTERM → ISPLACEOFCOPYINGTOWITHINPLACEOFCOPYING
73 COPY → BEGETSRELATINGTERM → ISPLACEOFCOPYINGTOFROM
74 COPY → BEGETSSTATUSTYPE → COPIABLE
75 COPY → BEGETSSTATUSTYPE → COPYING
76 COPY → BEGETSSTATUSTYPE → COPIED
77 COPY → BEGETSSTATUSTYPE → BEINGCOPIED
78 COPY → BEGETSSTATUSTYPE → COPIEDFROM
79 COPY → BEGETSSTATUSTYPE → BEINGCOPIEDFROM
80 COPY → BEGETSSTATUSTYPE → COPIABLEFROM

TABLE XXVII

Context Family Begetting Relationships

| Relationship | Has Reciprocal | Occurs |
|---|---|---|
| ContextType → BEGETSACTTYPE → ActType | ActType → ISACTTYPEBEGOTTENBY → ContextType | 1 |
| ContextType → BEGETSAGENTTYPE → AgentType | AgentType → ISAGENTTYPEBEGOTTENBY → ContextType | 0–1 |
| ContextType → BEGETSRESOURCETYPE → ResourceType | ResourceType → ISRESOURCETYPEBEGOTTENBY → ContextType | 0–n |
| ContextType → BEGETSTIMETYPE → TimeType | TimeType → ISTIMETYPEBEGOTTENBY → ContextType | 1–n |
| ContextType → BEGETSPLACETYPE → PlaceType | PlaceType → ISPLACETYPEBEGOTTENBY → ContextType | 1–n |
| ContextType → BEGETSRELATINGTERM → AFRVRelatingTerm | AFRVRelatingTerm → ISRELATINGTERMBEGOTTENBY → ContextType | 4–n |
| ContextType → BEGETSSTATUSTYPE → StatusType | StatusType → ISSTATUSTYPEBEGOTTENBY → ContextType | 0–n |

TABLE XXVIII

Context Description Relationships

Relationship

ContextType [#n] → HASACTTYPE → ActType [#n] [occ: 1]
ContextType [#n] → HASAGENTTYPE → AgentType [#n.n] [occ: 0–n]
ContextType [#n] → HASRESOURCETYPE → ResourceType [#n.n] [occ: 0–n]
ContextType [#n] → HASTIMETYPE → TimeType [#n.n] [occ: 1–n]
ContextType [#n] → HASPLACETYPE → PlaceType [#n.n] [occ: 1–n]
ContextType [#n] → HASSTATETYPE → StateType [#n.n] [occ: 0–n]

TABLE XXIX

Example of Context Description
Context Description for ORIGINATINGEVENT

1 ORIGINATINGEVENT [#1] → HASACTTYPE → ORIGINATE [#2] [OCC: 1]
2 ORIGINATINGEVENT [#1] → HASAGENTTYPE → ORIGINATOR [#3.N] [OCC: 1–N]
3 ORIGINATINGEVENT [#1] → HASRESOURCETYPE → ORIGINATION [#4.N] [OCC: 1–N]
4 ORIGINATINGEVENT [#1] → HASRESOURCETYPE → ORIGINATINGTOOL [#5.N] [OCC: 0–N]
5 ORIGINATINGEVENT [#1] → HASTIMETYPE → TIMEOFORIGINATING [#6.N] [OCC: 1–N]
6 ORIGINATINGEVENT [#1] → HASPLACETYPE → PLACEOFORIGINATING [#7.n] [occ: 1–n]

TABLE XXX

REL Rights that are based on definitions of RDD ActTypes

| REL term | REL/RDD definition, REL comments<br>Note: Definitions and comments are normative. The comments provide clarification and examples of the definition, and in come cases provide a specification for the contextualization of the Act. | REL mapping to RDD, RDD further comments (informative)<br>Note: Definitions, Genealogies, Context Descriptions and Families for all RDD Terms are found in Part 2 of Annex A of the RDD Standard. |
|---|---|---|
| Read | To read a digital resource from a repository.<br>The verb here refers to the primitive computer process, not to the act of reading by a human being. Read may apply to a part of a resource. Security attributes must be preserved. | mx:Read → ISTYPEOF → READ<br>mx:Read → ISTYPEOF → ACTTYPE_1 |
| Write | To write a digital resource to a repository.<br>The verb here refers to the primitive computer process, not to the act of writing by a human being. Write implies saving a resource, but it does not include any right to adapt or copy a digital resource. Security attributes must be preserved. | mx:Write → ISTYPEOF → WRITE<br>mx:Write → ISTYPEOF → ACTTYPE_1 |
| Execute | To execute a software program.<br>The verb here refers to the primitive computer process of executing a program. | mx:Execute → ISTYPEOF → EXECUTE<br>mx:Execute → ISTYPEOF → ACTTYPE_1 |
| Adapt | To make changes to a resource to create a new resource.<br>When Adapt is applied to a digital resource, two distinct resources will exist at the end of the process, one of which is the original resource and one which is not (if only one resource exists, the act is not Adapt but Modify). Changes may include the addition and removal of elements of the original resource, including the embedding of other digital resources. Adapt may be used with one or more conditions that specify attributes that must remain unchanged by the process of adapting (for example, the preservation of a header record). The repositories of the two resources may be the same. | mx:Adapt → ISTYPEOF → ADAPT<br>mx:Adapt → ISTYPEOF → ACTTYPE_1<br>mx:Adapt for a digital resource is contextualized in ADAPT_1.<br>ADAPT_1 → ISTYPEOF → ADAPT |
| Copy | To make a perfect reproduction of a resource.<br>When Copy is applied to a digital resource, it is achieved when a new resource exists in a destination repository whose attributes are identical to those of the original, but for some excepted attributes (for example, to allow for changing the file modification date of the copy). Copy may be used with one or more conditions that limit the set of excepted attributes that may be | mx:Copy → ISTYPEOF → COPY<br>mx:Copy → ISTYPEOF → ACTTYPE_1<br>mx:Copy for a digital resource is contextualized in COPY_1.<br>COPY_1 → ISTYPEOF → COPY<br>Scope of Copy: the idea of a "perfect" or exact copy is a paradox: nothing can be a "perfect" likeness without being the same entity as the original. For example, in the case of a physical Replica, the new resource will always have different Place attributes from the original at the same Time, or vice versa. A Replica always differs in some way |

TABLE XXX-continued

REL Rights that are based on definitions of RDD ActTypes

|  |  |  |
|---|---|---|
|  | changed by the process of copying. The source and destination may be the same repository. | from its Source; the question is therefore: How much can something differ and still be "the same" (a "perfect" reproduction)? For example, it is common for Names, Identifiers and other metadata to differ in a Replica. Particular Contexts for Types of "Copy" include the constraints that determine the limits of difference of attribute between Replica and Source. |
| Extract | To derive a new resource by taking a fragment out of an existing resource.<br>When Extract is applied to a digital resource, the attributes of the new digital resource must be identical to those of the fragment in the original. The attribute exception provisions for Copy apply to Extract. The repositories of the two resources may be the same. | mx:Extract → ISTYPEOF → EXTRACT<br>mx:Extract → ISTYPEOF → ACTTYPE_1<br>mx:Extract for a digital resource is contextualized in EXTRACT_1.<br>EXTRACT_1 → ISTYPEOF → EXTRACT |
| Embed | To include a complete resource in another resource.<br>When Embed is applied to a digital resource, it may be achieved, for example, by copying a resource so that the copied resource forms a part of another resource, or (in a Web or other distributed context) by including a link to another resource. The entire resource must be embedded. If copying is involved, then the attribute exception provisions for Copy apply to Embed. The other resource may be pre-existing, or may be created by the act of combining this resource with one or more others. The repositories of the original resource and the resource into which it is embedded may be the same. | mx:Embed → ISTYPEOF → EMBED<br>mx:Embed → ISTYPEOF → ACTTYPE_1<br>mx:Embed for a digital resource is contextualized in EMBED_1.<br>EMBED_1 → ISTYPEOF → EMBED |
| Modify | To make and save changes in a resource without creating a new resource.<br>When Modify is applied to a digital resource, a single resource remains at the end of the process (if a new resource is created, the act is Adapt). Changes may include the addition and removal of elements of the original resource, including the embedding of other digital resources. Modify may be used with one or more conditions that specify attributes that must remain unchanged by the process of Modifying (for example, the preservation of a header record). The repository must remain the same. | mx:Modify → ISTYPEOF → MODIFY<br>mx:Modify → ISTYPEOF → ACTTYPE_1<br>mx:Modify for a digital resource is contextualized in MODIFY_1.<br>MODIFY_1 → ISTYPEOF → MODIFY |
| Enlarge | To Modify a resource by making it larger.<br>When Enlarge is applied to a digital resource, a single resource is preserved at the end of the process. Changes may include the addition of new material including the embedding of other digital resources, but not the removal or changing of elements of the original resource. The repository must remain the same. | mx:Enlarge → ISTYPEOF → ENLARGE<br>mx:Enlarge → ISTYPEOF → ACTTYPE_1<br>mx:Enlarge for a digital resource is contextualized in ENLARGE_1.<br>ENLARGE_1 → ISTYPEOF → ENLARGE |
| Edit | To Adapt and/or Modify a resource. Edit is a composite to describe the right either to Adapt or Modify a resource, or to do both. | mx:Edit → ISTYPEOF → EDIT<br>mx:Edit → ISTYPEOF → ACTTYPE_1 |

TABLE XXX-continued

REL Rights that are based on definitions of RDD ActTypes

| | | |
|---|---|---|
| Transfer | To relocate a resource from one place to another. When Transfer is applied to a digital resource, it is typically achieved by Copying and then deleting the original resource. However, a specific process is not mandated provided that when Transfer is complete a resource with the attributes identical to those of the original is at the destination. If copying is involved, then the attribute exception provisions for Copy apply to transfer. The Transfer may be between repositories or from one location to another within a repository. | mx:Transfer → ISTYPEOF → MOVE<br>mx:Transfer → ISTYPEOF → ACTTYPE_1<br>mx:Transfer for a digital resource is contextualized in TRANSFER:<br>TRANSFER → ISTYPEOF → MOVE |
| Play | To create a transient, perceivable rendition of a resource. When Play is applied to a digital resource, it may cover the making of any forms of transient representation that may be directly perceived (that is, without any intermediary process) with at least one of the five human senses. Play includes playing a video or audio clip, displaying an image or text document, or creating representations that may be "touched" with virtual reality technology. Content may be rendered in any order or sequence according to the technical constraints of the resource and renderer. | mx:Play → ISTYPEOF → PLAY<br>mx:Play → ISTYPEOF → ACTTYPE_1<br>mx:Play for a digital resource is contextualized in PLAY_1:<br>PLAY_1 → ISTYPEOF → PLAY |
| Print | To create a fixed and directly perceivable rendition of a resource. When Print is applied to a digital resource, it refers to the creation of a fixed representation that may be directly perceived (that is, without any intermediary process) with one or more of the five human senses, such as hard-copy prints of images or text. | mx:Print → ISTYPEOF → PRINT<br>mx:Print → ISTYPEOF → ACTTYPE_1<br>mx:Print for a digital resource is contextualized in PRINT_1:<br>PRINT_1 → ISTYPEOF → PRINT |
| Enable | To make a resource capable of being interacted with. When Enable is applied to a digital resource, it results in a change in an existing resource such that it becomes capable of being read, written to or executed. Enabling may be partial and/or contextual. | mx:Enable → ISTYPEOF → ENABLE<br>mx:Enable → ISTYPEOF → ACTTYPE_1<br>mx:Enable for a digital resource is contextualized in ENABLE_1:<br>ENABLE_1 → ISTYPEOF → ENABLE |
| Disable | To make a resource incapable of being interacted with. When Disable is applied to a digital resource, it results in a change in an existing digital resource or its environment such that it becomes inaccessible to software but is not removed from the repository. Disabling may be partial and/or contextual. | mx:Disable → ISTYPEOF → DISABLE<br>mx:Disable → ISTYPEOF → ACTTYPE_1<br>mx:Disable for a digital resource is contextualized in DISABLE_1:<br>DISABLE_1 → ISTYPEOF → DISABLE |
| Install | To follow the instructions provided by an installing resource. An installing resource is a resource that provides instructions which when followed result in one or more resources that are new, or enabled, or both new and enabled. | mx:Install → ISTYPEOF → INSTALL<br>mx:Install → ISTYPEOF → ACTTYPE_1 |

TABLE XXX-continued

REL Rights that are based on definitions of RDD ActTypes

| | | |
|---|---|---|
| Uninstall | To follow the instructions provided by an uninstalling resource. An uninstalling resource is a resource that provides instructions which when followed result in one or more resources being disabled or deleted. | mx:Uninstall → ISTYPEOF → UNINSTALL<br>mx:Uninstall → ISTYPEOF → ACTTYPE_1 |
| Delete | To remove a digital resource permanently from its source repository. Delete applies only to digital resources. Delete is not capable of reversal, If an "undelete" action is possible, then the resource has been disabled, not deleted. | mx:Delete → ISTYPEOF → DELETE<br>mx:Delete → ISTYPEOF → ACTTYPE_1 |

Further description of the exemplary rights data dictionary in provided in the electronic document that is submitted herewith and incorporated by reference, as noted above.

Having thus described a preferred embodiment of a data dictionary, and applications for it, it should be apparent to those skilled in the art that certain advantages of the within system have been achieved. It should also be appreciated that various modifications, adaptations, and alternative embodiments thereof may be made within the scope and spirit of the present invention. For example, a specific application of the context model to a data dictionary for digital rights management has been illustrated, but it should be apparent that the inventive concepts described above would be equally applicable to data dictionaries for other applications. The invention is defined by the following claims.

What is claimed is:

1. A method for creating a data dictionary for definition of terms of a rights expression language, the method comprising operating at least one computer to perform the steps of:
   assigning a single meaning signifying a basic action to a first term of the data dictionary;
   assigning different singular meanings to each of a plurality of terms comprising a basic term set of the data dictionary, wherein each of the different singular meanings is derived partially with reference to the first term, and wherein a context term of the basic term set is assigned a meaning signifying a circumstance in which the basic action or a type of basic action occurs;
   defining a plurality of basic relational terms, whereby each respective one of the plurality of basic relational terms links the context term of the basic term set to respective other ones of the basic term set;
   defining other terms as needed to convey an intended semantic content of the expression language, each of the other terms defined as a type of a term selected from the basic term set or the first term, whereby ones of the other terms are linked by any selected one of the plurality of basic relational terms, wherein the method is operative to create the data dictionary defining terms of a rights expression language in a memory operatively associated with the at least one computer; and
   displaying at least a portion of the data dictionary using a display operatively associated with the at least one computer.

2. A method for determining semantic content of an expression in a rights expression language in accordance with a data dictionary, the method comprising operating at least one computer to perform the steps of:
   operatively adopting a dictionary-like data dictionary, wherein the data dictionary comprises a first term signifying a basic action, a plurality of basic terms each signifying a meaning derived partially with reference to the first term and wherein a context term of the basic term signifies a circumstance in which the basic action or a type of basic action occurs, and a plurality of basic relational terms each linking the context term to a respective other one of the basic terms;
   identifying each discrete term of an expression, the expression comprising a plurality of discrete terms;
   determining whether each discrete term has a meaning that is equivalent to that of a derived term of the data dictionary, wherein a derived term comprises a term having an assigned meaning at least partially derived from a term selected from the basic term set, from the first term, or from another derived term and thereby related by at least one of a plurality of relational terms to at least one other term of the data dictionary;
   determining, in a memory operably associated with the at least one computer, semantic content of the expression at least in part from semantic content of each discrete term that matches a derived term; and
   providing an output in accordance with the semantic content to a computer output device, wherein the output is selected from the group consisting of a record, a message, and a translation of the expression.

3. The method of claim 2, wherein the adopting step further comprises adopting the data dictionary comprising the plurality of basic terms, the plurality of basic terms comprising an agent term signifying an entity that performs the basic action.

4. The method of claim 3, wherein the adopting step further comprises adopting the data dictionary comprising the plurality of basic terms, the plurality of basic terms comprising a time term signifying temporal parameters of a context.

5. The method of claim 4, wherein the adopting step further comprises adopting the data dictionary comprising the plurality of basic terms, the plurality of basic terms comprising a place term signifying spatial parameters of a context.

6. The method of claim 5, wherein the adopting step further comprises adopting the data dictionary comprising the plurality of basic terms, the plurality of basic terms comprising a resource term signifying an entity that is not an agent, is not a place, and is not a time, that is involved in a context.

7. The method of claim 2, wherein the adopting step further comprises adopting the data dictionary comprising a plurality of action families, wherein each of the action families comprises a unique set of derived terms, the unique set of derived terms defined by the first term of by a derived term derived as a type of the first term, wherein members of the unique set include a plurality of derived terms each derived from a respective one of the plurality of basic terms.

8. The method of claim 2, wherein the adopting step further comprises adopting the data dictionary comprising a plurality of derived terms, wherein every derived term of the plurality of derived terms is defined by a unique begetting relationship with one of the first term, the plurality of basic terms or another one of the plurality of defined terms.

9. The method of claim 2, wherein the adopting step further comprises adopting the data dictionary comprising the first terms, basic terms, basic relational terms and a plurality of derived terms, each associated with a plurality of attributes, the attributes including a unique identifier, a type, and a status.

10. The method of claim 2, wherein the adopting step further comprises adopting the data dictionary comprising the plurality of relational terms, wherein each of the plurality of relational terms comprises a relating term describing a relationship between a single subject term and a single object term, the subject term identifying a term of the data dictionary that is a singular subject of the relationship and the object term identifying a term of the data dictionary that is a singular object of the relationship; whereby each of the plurality of relational terms is unique.

11. A method for translating terms of an expression in a first rights expression language to translated terms of a second rights expression language, the method comprising operating at least one computer to perform the steps of:

operatively adopting a data dictionary, wherein the data dictionary comprises a first term signifying a basic action, a plurality of basic terms each signifying a meaning derived partially with reference to the first term and wherein a context term of the basic terms signifies a circumstance in which the basic action occurs, and a plurality of derived terms, each of the plurality of derived terms having an assigned singular meaning at least partially derived from a term selected from the basic term set, from the first term, or from another one of the plurality of derived terms and related by a unique one of a plurality of relational terms to at least one other term of the data dictionary;

operatively adopting a first map comprising one-to-one links between each of a plurality of first language terms and one of the first term, the plurality of basic terms, or of the plurality of derived terms; operatively adopting a second map comprising one-to-one links between each of a plurality of second language terms and one of the first term, the plurality of basic terms, or of the plurality of derived terms;

identifying a corresponding term of the data dictionary for each first language term of the expression, using the first map identifying, in a memory operably associated with the at least one computer, a corresponding second language term for each term of the data dictionary identified in the first identifying step, using the second map; and providing an output to a computer output device, wherein the output comprises an expression translated from the first language to the second language.

12. The method of claim 11, wherein the first adopting step further comprises adopting the data dictionary comprising the plurality of basic terms, the plurality of basic terms comprising an agent term signifying an entity that performs the basic action.

13. The method of claim 12, wherein the first adopting step further comprises adopting the data dictionary comprising the plurality of basic terms, the plurality of basic terms comprising a time term signifying temporal parameters of a context.

14. The method of claim 13, wherein the first adopting step further comprises adopting the data dictionary comprising the plurality of basic terms, the plurality of basic terms comprising a place term signifying spatial parameters of a context.

15. The method of claim 14, wherein the first adopting step further comprises adopting the data dictionary comprising the plurality of basic terms, the plurality of basic terms comprising a resource term signifying an entity that is not an agent, is not a place, and is not a time, that is involved in a context.

16. The method of claim 11, wherein the first adopting step further comprises adopting the data dictionary comprising a plurality of action families, wherein each of the action families comprises a unique set of derived terms, the unique set of derived terms defined by the first term or a derived term derived as a type of the first term, wherein members of the unique set include a plurality of derived terms each derived from a respective one of the plurality of basic terms.

17. The method of claim 11, wherein the first adopting step further comprises adopting the data dictionary comprising a plurality of derived terms, wherein every derived term of the plurality of derived terms is defined by a unique begetting relationship with one of the first term, the plurality of basic terms or another one of the plurality of defined terms.

18. The method of claim 11, wherein the first adopting step further comprises adopting the data dictionary comprising the first terms, basic terms, basic relationship terms and a plurality of derived terms, each associated with a plurality of attributes, the attributes including a unique identifier, a type, and a status.

19. The method of claim 11, wherein the first adopting step further comprises adopting the data dictionary comprising the plurality of relational terms, wherein each of the plurality of relational terms comprises a relating term describing a relationship between a single subject term and a single object term, the subject term identifying a term of the data dictionary that is a singular subject of the relationship and the object term identifying a term of the data dictionary that is a singular object of the relationship; whereby each of the plurality of relational terms is unique.

20. The method of claim 11, wherein the second adopting step further comprises adopting each of the plurality of first language terms created according to term creation rules of the data dictionary.

21. The method of claim 11, wherein the third adopting step further comprises adopting each of the plurality of second language terms created according to term creation rules of the data dictionary.

* * * * *